US012100338B2

(12) United States Patent
Jung et al.

(10) Patent No.: US 12,100,338 B2
(45) Date of Patent: Sep. 24, 2024

(54) DISPLAY DEVICE AND DRIVING METHOD OF THE SAME

(71) Applicant: LG Display Co., Ltd., Seoul (KR)

(72) Inventors: Jin Hyun Jung, Paju-si (KR); Sun Yoon Kim, Paju-si (KR); Chang Woo Lee, Paju-si (KR); Hyun Wook Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/954,264

(22) Filed: Sep. 27, 2022

(65) Prior Publication Data

US 2023/0101025 A1 Mar. 30, 2023

(30) Foreign Application Priority Data

Sep. 28, 2021 (KR) ........................ 10-2021-0128016

(51) Int. Cl.
*G09G 3/32* (2016.01)

(52) U.S. Cl.
CPC ....... *G09G 3/32* (2013.01); *G09G 2310/0278* (2013.01); *G09G 2310/08* (2013.01)

(58) Field of Classification Search
CPC ............. G09G 3/32; G09G 2310/0278; G09G 2310/08
See application file for complete search history.

(56) References Cited

U.S. PATENT DOCUMENTS

| | | | | | |
|---|---|---|---|---|---|
| 6,407,729 | B1 | 6/2002 | Moon | | |
| 7,002,544 | B2 | 2/2006 | Sekido | | |
| 8,232,941 | B2 | 7/2012 | Yeo et al. | | |
| 2003/0098833 | A1* | 5/2003 | Sekido | G09G 3/3688 | 345/87 |
| 2008/0136756 | A1 | 6/2008 | Yeo et al. | | |
| 2009/0079719 | A1* | 3/2009 | Lee | G09G 3/20 | 327/158 |
| 2009/0184912 | A1* | 7/2009 | Eun | G09G 3/3648 | 345/94 |
| 2009/0251454 | A1* | 10/2009 | Jang | G09G 5/008 | 348/512 |

(Continued)

FOREIGN PATENT DOCUMENTS

| | | | |
|---|---|---|---|
| CN | 101202024 | A | 6/2008 |
| CN | 101763808 | A | 6/2010 |

(Continued)

OTHER PUBLICATIONS

The Japan Patent Office, Office Action, Japanese Patent Application No. 2022-155088, Sep. 26, 2023, six pages.

(Continued)

*Primary Examiner* — Sejoon Ahn
(74) *Attorney, Agent, or Firm* — Fenwick & West LLP

(57) ABSTRACT

Provided is a display device including a display panel configured to display an image, a gate driving circuit connected to the display panel, a data driving circuit connected to the display panel, and a timing controller configured to control the gate driving circuit and the data driving circuit, in which the data driving circuit senses a gate signal output from the gate driving circuit, and a data output timing is controlled based on an operation of another device or a signal generated therefrom together with the sensed gate signal.

11 Claims, 25 Drawing Sheets

(56) References Cited

U.S. PATENT DOCUMENTS

| | | | | |
|---|---|---|---|---|
| 2009/0252268 | A1* | 10/2009 | Jang | G09G 3/20<br>375/362 |
| 2009/0315868 | A1* | 12/2009 | Yokoyama | G09G 3/3688<br>345/204 |
| 2013/0076769 | A1* | 3/2013 | Park | G09G 3/3648<br>345/547 |
| 2016/0284297 | A1 | 9/2016 | Cheng et al. | |
| 2017/0193877 | A1* | 7/2017 | Lee | G09G 3/3291 |
| 2017/0243529 | A1* | 8/2017 | Hung | G09G 3/20 |
| 2017/0270863 | A1* | 9/2017 | Suh | G09G 3/3688 |
| 2020/0082766 | A1* | 3/2020 | Kim | G09G 3/2003 |
| 2020/0168175 | A1* | 5/2020 | Tsuchi | G09G 3/3685 |
| 2020/0202779 | A1* | 6/2020 | Chang | G09G 3/3233 |
| 2021/0020137 | A1* | 1/2021 | Jang | G09G 3/3688 |

FOREIGN PATENT DOCUMENTS

| | | | |
|---|---|---|---|
| CN | 105788504 | A | 7/2016 |
| CN | 109994085 | A | 7/2019 |
| EP | 3131086 | A1 | 2/2017 |
| JP | 2003-162262 | A | 6/2003 |
| KR | 10-2016-0078781 | A | 7/2016 |

OTHER PUBLICATIONS

European Patent Office, Extended European Search Report and Opinion, EP Patent Application No. 22198485.9, Feb. 9, 2023, 12 pages.

China National Intellectual Property Administration, Office Action, Chinese Patent Application No. 202211192679.X, Mar. 27, 2024, 17 pages.

* cited by examiner

DISPLAY DEVICE AND DRIVING METHOD OF THE SAME

This application claims the priority of Korean Patent Application No. 10-2021-0128016, filed on Sep. 28, 2021, which is incorporated by reference herein.

BACKGROUND

Field

The present disclosure relates to a display device and a driving method of the same.

Discussion of the Related Art

With the development of information technology, the market for display devices, which are connection media between users and information, has been growing. Accordingly, there has been an increase in use of display devices such as light-emitting display devices (LED), quantum dot display devices (QDD), and liquid crystal display devices (LCD).

The display devices described above each include a display panel including subpixels, a driving unit configured to output a driving signal for driving the display panel, a power supply unit configured to generate power to be supplied to the display panel or the driving unit, etc.

In each of the display devices, when a driving signal, for example, a scan signal, a data signal, etc. is supplied to the subpixels formed in the display panel, an image may be displayed by selecting specific subpixels to transmitting light or directly emitting light.

SUMMARY

Accordingly, the present disclosure is directed to a display device and a driving method of the same that substantially obviate one or more problems due to limitations and disadvantages of the related art.

An object of embodiments is to automatically correct and optimize a data output timing of a data driving unit based on interworking between a timing controller and the data driving circuit, and to increase driving stability and output accuracy of the data driving circuit.

Additional advantages, objects, and features of the embodiments will be set forth in part in the description. The objectives and other advantages may be realized and attained by the structure particularly pointed out in the written description and claims hereof as well as the appended drawings.

There is therefore provided a display device including a display panel configured to display an image, a gate driving circuit connected to the display panel, a data driving circuit connected to the display panel, and a timing controller configured to control the gate driving circuit and the data driving circuit, in which the data driving circuit senses a gate signal output from the gate driving circuit, and a data output timing is controlled based on an operation of another device (e.g. another component or controller) or a signal generated therefrom together with the sensed gate signal.

The data driving circuit may include at least two sensing terminals connected to two points of a gate line or a dummy gate line located on the display panel to sense a gate signal output from the gate driving circuit.

The at least two sensing terminals may be located at an outermost side of one side and an outermost side of the other side of the data driving circuit.

A data output timing of the data driving circuit-may be controlled based on the gate signal and a gate start pulse applied to the gate driving circuit.

A data output timing of the data driving circuit-may be controlled based on the gate signal and a source output activation signal applied to the data driving circuit.

A data output timing of the data driving circuit-may be controlled based on the gate signal and a data output signal through an interface coupled between the timing controller and the data driving circuit.

The data driving circuit may include at least two data driving circuits electrically connected to each other through a delay pulse line for inputting and outputting a pulse including data output delay information of another device or the data driving circuit.

The data driving circuit may include a signal sensing circuit configured to calculate a logic high start time, a logic high end time, and a logic high holding time of a gate signal based on the gate signal output from the gate driving circuit, a gate start pulse applied to the gate driving circuit, and a voltage maintaining the same level as a level of gate high of the gate signal. For instance, a logic high may be interpreted as a value for a parameter (e.g., voltage) which is representative of a digital signal of 1 (on ON). As such, a logic high start time may be interpreted as the time at which the digital signal changes to 1, a logic high end time may be interpreted as the time at which the digital signal changes from 1, and a logic high holding time may be interpreted as the time during which the logic high remains at (e.g., is held at) 1.

There is also provided a method of driving a display device including a display panel configured to display an image, a gate driving circuit connected to the display panel, a data driving circuit connected to the display panel, and a timing controller configured to control the gate driving circuit-and the data driving circuit. The method includes sensing a gate signal output from the gate driving circuit, calculating a data output delay of the data driving circuit based on the gate signal, and setting a data output timing of the data driving circuit based on the data output delay.

The data output timing of the data driving circuit-may be controlled based on the gate signal and a gate start pulse applied to the gate driving circuit, controlled based on the gate signal and a source output activation signal applied to the data driving circuit, or controlled based on the gate signal and a data output signal through an interface coupled between the timing controller and the data driving circuit.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) and together with the description serve to support the claims. In the drawings:

DETAILED DESCRIPTION

Reference will now be made in detail to the preferred embodiments, examples of which are illustrated in the accompanying drawings. Wherever possible, the same reference numbers will be used throughout the drawings to refer to the same or like parts.

A display device according to the present disclosure may be implemented as a television, an image player, a personal computer (PC), a home theater, an automobile electric device, a smart phone, etc., and is not limited thereto. The display device according to the present disclosure may be implemented as, for instance, an LED display device (which may include an OLED display device), a QDD display device, an LCD display device, etc. However, hereinafter, for convenience of description, an LED (e.g., LED display device) that directly emits light based on an inorganic light-emitting diode or an organic light emitting-diode will be given as an example.

Figure 1:
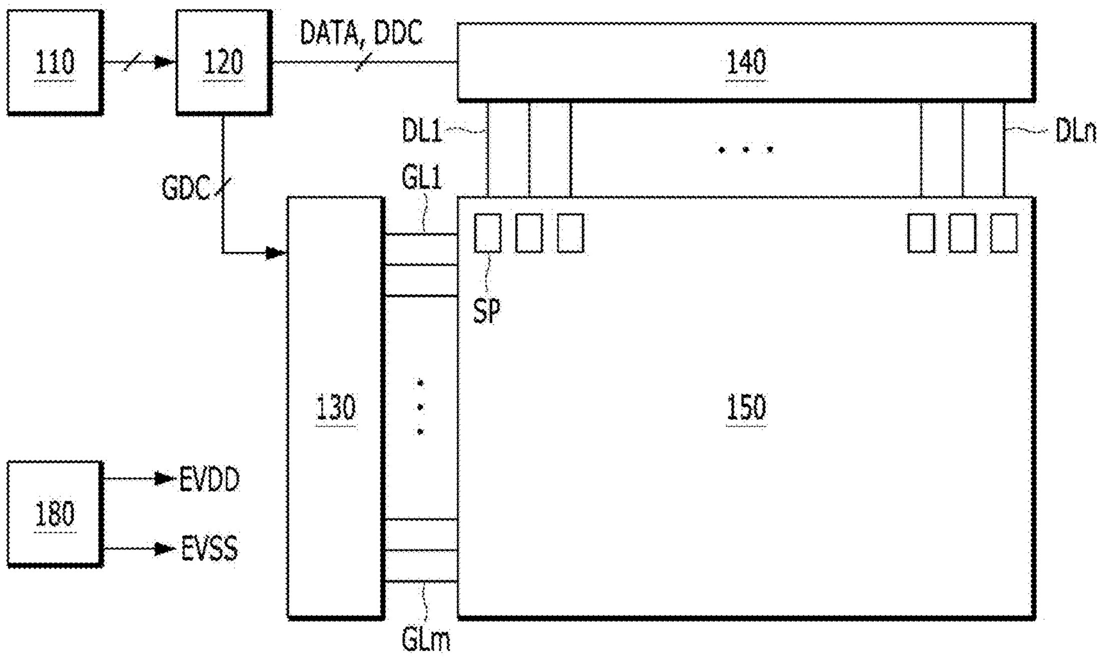
FIG. 1 is a block diagram schematically illustrating an LED display device.
Figure 2:
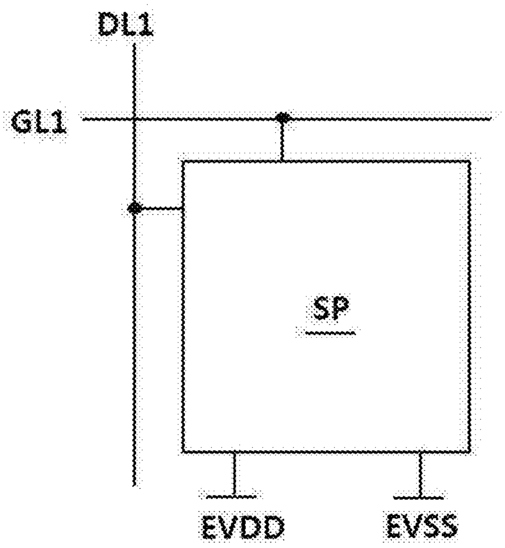
FIG. 2 is a configuration diagram schematically illustrating a subpixel illustrated in FIG. 1.

FIG. 1 is a block diagram schematically illustrating an LED display device, and FIG. 2 is a configuration diagram schematically illustrating a subpixel of FIG. 1.

As illustrated in FIGS. 1 and 2, the LED display device may include an image supply unit (circuit) 110, a timing controller 120, a gate driving unit (circuit) 130, a data driving unit (circuit) 140, a display panel 150, a power supply unit (circuit) 180, etc.

The image supply unit (set or host system) 110 may output various driving signals along with an image data signal supplied from the outside or an image data signal stored in an internal memory. The image supply unit 110 may supply a data signal and various driving signals to the timing controller 120.

The timing controller 120 may output a gate timing control signal GDC for controlling the operation timing of the gate driving unit 130, a data timing control signal DDC for controlling the operation timing of the data driving unit 140, various synchronization signals (Vsync, which is a vertical synchronization signal, and Hsync, which is a horizontal synchronization signal), etc. The timing controller 120 may supply a data signal DATA supplied from the image supply unit 110 together with the data timing control signal DDC to the data driving unit 140. The timing controller 120 may be formed as an integrated circuit (IC) and be mounted on a printed circuit board, however, the timing controller 120 is not limited thereto.

The gate driving unit 130 may output a gate signal (or a scan signal) in response to the gate timing control signal GDC supplied from the timing controller 120. The gate driving unit 130 may supply a scan signal to subpixels included in the display panel 150 through gate lines GL1 to GLm. The gate driving unit 130 may be formed as an IC or may be formed directly on the display panel 150 using a gate-in-panel method, but is not limited thereto.

The data driving unit 140 may sample and latch the data signal DATA in response to the data timing control signal DDC supplied from the timing controller 120, convert a digital data signal into an analog data voltage based on a gamma reference voltage, and output the analog data voltage. The data driving unit 140 may supply a data voltage to the subpixels included in the display panel 150 through data lines DL1 to DLn. The data driving unit 140 may be formed as an IC and mounted on the display panel 150 or mounted on a printed circuit board, but is not limited thereto.

The power supply unit 180 may generate first power having a high potential and second power having a low potential based on an external input voltage supplied from the outside, and output the first power and the second power through a first power line EVDD and a second power line EVSS. The power supply unit 180 may generate and output a voltage necessary to drive the gate driving unit 130 (for example, a gate voltage including a gate high voltage and a gate low voltage) or a voltage necessary to drive the data driving unit 140 (including a drain voltage and a half-drain voltage) in addition to the first power and the second power.

The display panel 150 may display an image in response to a driving signal including a gate signal and a data voltage, first power, second power, etc. The subpixels of the display panel 150 directly emit light. The display panel 150 may be manufactured based on a substrate having rigidity or flexibility, such as glass, silicon, polyimide, etc. In addition, the subpixels that emit light may include pixels including red, green, and blue or pixels including red, green, blue, and white.

For example, one subpixel SP may be connected to the first data line DL1, the first gate line GL1, the first power line EVDD, and the second power line EVSS, and may include a pixel circuit having a switching transistor, a driving transistor, a capacitor, an organic light-emitting diode (OLED), etc. Since the subpixel SP used in the LED display device directly emits light, a circuit configuration is complicated, for example may contain a larger number of transistors and connections therebetween. In addition, there are various compensation circuits to compensate for deterioration of the OLED that emits light as well as the driving transistor that supplies a driving current to the OLED. Accordingly, note that in FIG. 1 the subpixel SP is schematically illustrated in the form of a block.

Meanwhile, in the above description, the timing controller 120, the gate driving unit 130, the data driving unit 140, etc. have been described as individual elements. However, depending on the implementation method of the LED display device, one or more of the timing controller 120, the gate driving unit 130, and the data driving unit 140 may be integrated into one IC.

Figure 3A:
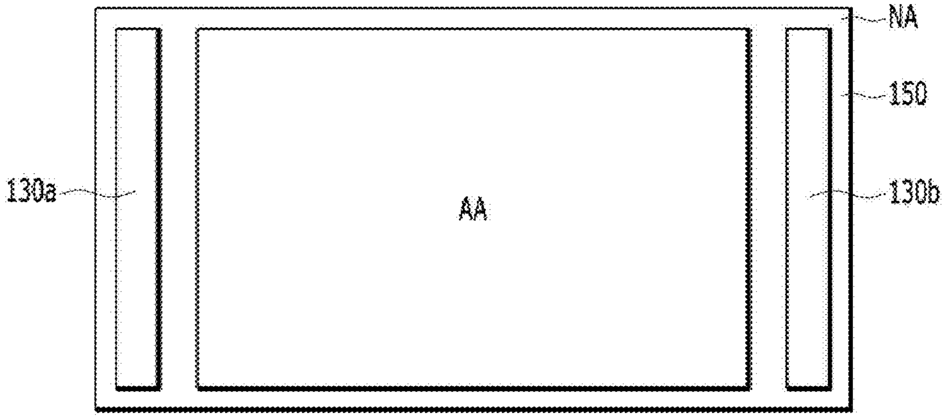
FIGS. 3A and 3B are diagrams illustrating arrangement examples of a gate-in-panel type gate driving unit.
Figure 3B:
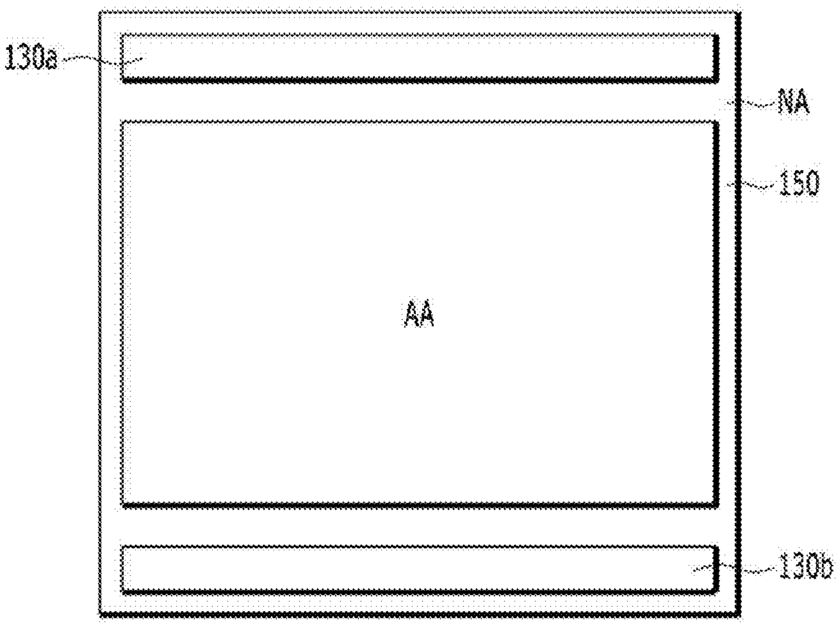
Figure 4:
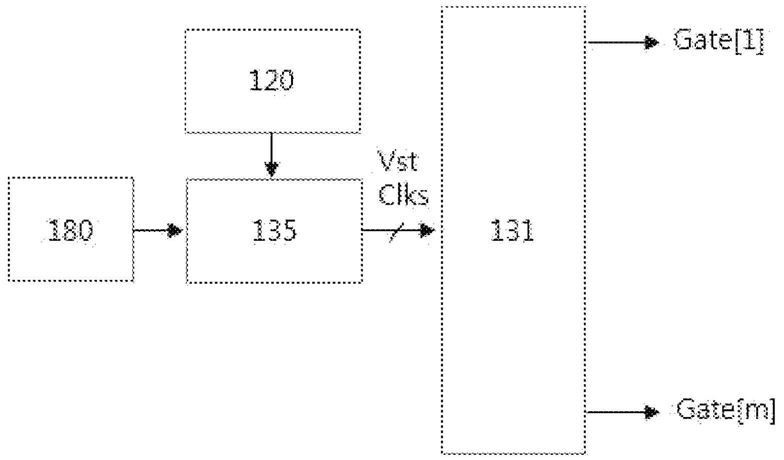
FIGS. 4 and 5 are illustrative configuration diagrams of devices related to the gate-in-panel type gate driving unit.
Figure 5:
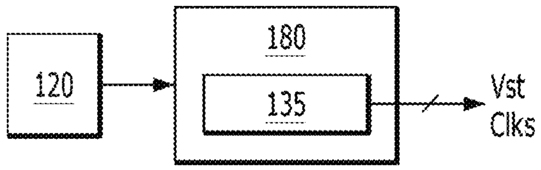

FIGS. 3A and 3B are diagrams illustrating arrangement examples of a gate-in-panel type gate driving unit, and FIGS. 4 and 5 are illustrative configuration diagrams of devices related to the gate-in-panel type gate driving unit.

As illustrated in FIGS. 3A and 3B, gate-in-panel type gate driving units 130*a* and 130*b* are disposed in a non-display area NA of the display panel 150. As illustrated in FIG. 3A, the gate driving units 130*a* and 130*b* may be disposed in left and right parts of the non-display area NA in the display panel 150. Alternatively, as illustrated in FIG. 3B, the gate driving units 130*a* and 130*b* may be disposed in upper and lower parts of the non-display area NA in the display panel 150.

The gate driving units 130*a* and 130*b* are illustrated and described as being disposed in the non-display area NA located on the left and right sides or upper and lower sides of a display area AA. However, the scan driving units 130*a* and 130*b* may be disposed on one of the left side, the right side, the upper side, or the lower side.

As illustrated in FIG. 4, the gate-in-panel type gate driving unit 130 may include a shift register 131 and a level shifter 135. The level shifter 135 may generate clock signals Clks and a start signal Vst (e.g., a gate in panel start signal, such as a gate start pulse) based on signals and voltages output from the timing controller 120 and the power supply unit 180. The clock signals Clks may be generated in the form of K (K being an integer greater than or equal to 2) different phases, such as two-phase, four-phase, and eight-phase.

The shift register 131 may operate based on the signals Clks and Vst output from the level shifter 135, and output gate signals Gate[1] to Gate[m] capable of turning on or off a transistor formed on the display panel. The shift register 131 may be formed as a thin film on the display panel using a gate-in-panel method. Accordingly, the gate driving units 130*a* and 130*b* illustrated in FIGS. 3A and 3B may correspond to the shift register 131.

As illustrated in FIGS. 4 and 5, unlike the shift register 131, the level shifter 135 may be independently formed as an IC or may be included in the power supply unit 180, but this is only an example configuration and the present disclosure is not limited thereto.

Figure 6:
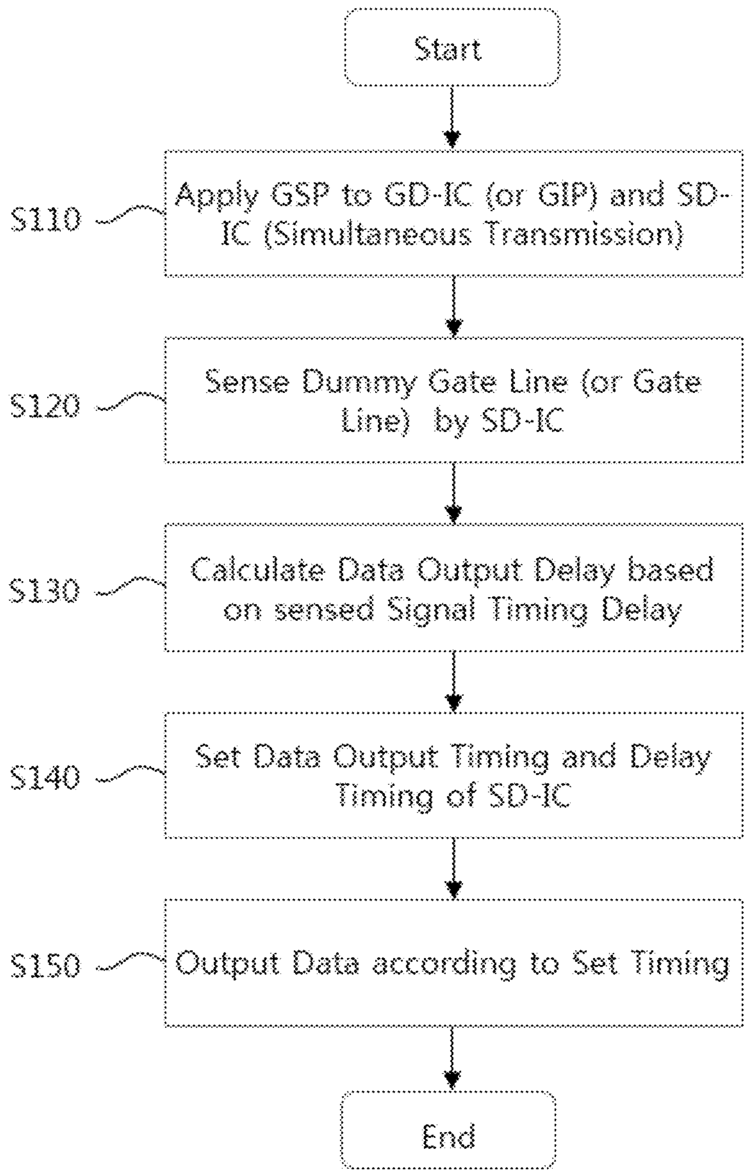
FIGS. 6 to 8 are diagrams schematically illustrating a method of automatically correcting a data output timing according to a first embodiment.
Figure 7:
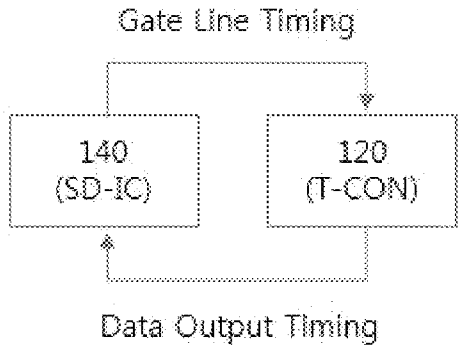
Figure 8:
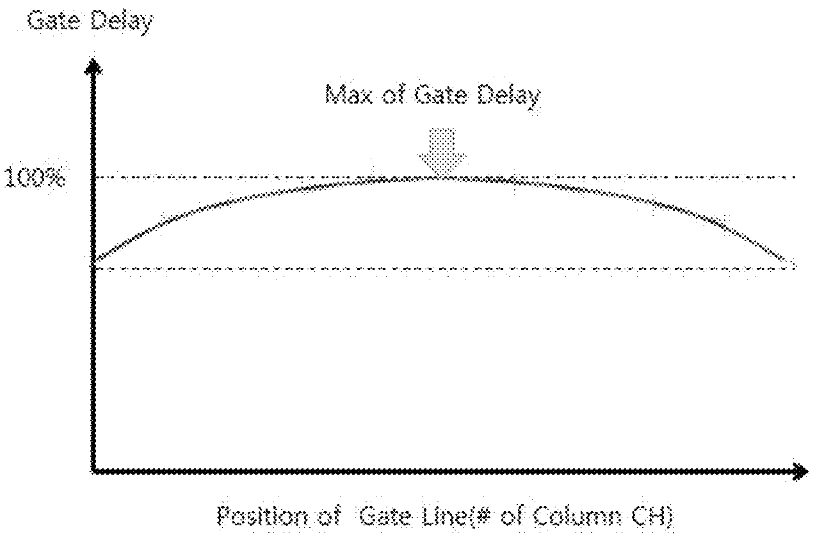

FIGS. 6 to 8 are diagrams for schematically describing a method of automatically correcting a data output timing according to a first embodiment.

As illustrated in FIGS. 6 to 8, in the LED display device according to the present disclosure, the data output timing of the data driving unit 140 may be automatically corrected based on interworking (i.e., cooperation or interaction) between the timing controller 120 (T-CON) and the data driving unit 140 (SD-IC). In particular, the data driving unit 140 (SD-IC) may sense a gate signal through a gate line, refer to an operation of another device or a signal generated therefrom, and perform analysis thereon, which enables the data driving unit 140 to automatically control the data output timing (which is described as follows). Here, the term "another device" may be understood to mean another component, such as a controller. For instance, the other component may be least one of: the data driving circuit 140, another data driving circuit 140B of the display device, the timing controller, a timing setting unit 128 of the timing controller 120; a timing setting unit 128 of the data driving circuit 140; or a timing control unit 145 of the data driving unit 140, a timing setting unit 128 of the other data driving circuit 140B; or a timing control unit 145 of the other data driving circuit 140B.

Although embodiments describe the data driving circuit sensing the gate signal and delays in the gate signal, it may be understood that another component or IC can be dedicated to performing the sensing. Therefore, in some embodiments, the gate signal is sensed by a component other than the data driving circuit. The other component may include two sensing terminals which operate in the same manner as the sensing terminals of the data driving unit described herein. The sensing terminals are disposed to sense the gate signal at a location corresponding to the location of the data driving circuit.

First, a gate start pulse GSP may be applied to the gate driving unit GD-IC or GIP and the data driving unit 140 (SD-IC) (S110). In this case, the gate start pulse GSP may be implemented to be simultaneously transmitted to the gate driving unit GD-IC and the data driving unit 140 (SD-IC).

Next, a control operation may be performed so that the data driving unit 140 (SD-IC) senses a dummy gate line transmitting a dummy gate signal or a gate line transmitting a gate signal (S120). The performance of this control operation results in a sensed signal timing delay in the gate signal or dummy gate signal. In this instance, the data driving unit 140 (SD-IC) may be implemented to sense a dummy gate line which may increase driving stability because, for instance, a dummy gate line would not introduce RC deviation caused by connection of a sensing line.

Next, a control operation may be performed so that the data driving unit 140 (SD-IC) calculates a data output delay based on the sensed signal timing delay (hereinafter, delay characteristic) using the sensed gate signal (S130).

Next, a data output timing and a delay timing of the data driving unit 140 (SD-IC) may be set based on the data output delay (S140).

Next, the data output timing of the data driving unit 140 may be automatically corrected according to the set data output timing and delay timing (S150).

In the first embodiment, the timing controller 120 (T-CON) and the data driving unit 140 (SD-IC) are implemented as separate ICs as an example. As such, when the timing controller 120 (T-CON) and the data driving unit 140 (SD-IC) are implemented as separate ICs, the data driving unit 140 may sense a gate signal transmitted through a dummy gate line transmitting a dummy gate signal or a gate line transmitting a gate signal, etc. to prepare gate line timing information (i.e. timing characteristics of the gate signal, for instance TDR (T_Delay Rising), TDF (T_Delay Falling), THS (T_High Start), THE (T_High End), etc., which are described later). In addition, the timing controller 120 may prepare data output timing information for automatically correcting the data output timing of the data driving unit 140 based on the gate line timing information transmitted from the data driving unit 140.

According to the above method, the data output timing of the data driving unit 140 may be automatically corrected in response to a gate signal delay. For instance, the graph of FIG. 8 illustrates an example of the gate signal delay for each position of the gate line.

Hereinafter, the first embodiment will be described in more detail. However, in the following description, as an example, the data driving unit senses the dummy gate line in order to prepare the gate line timing information.

Figure 9:
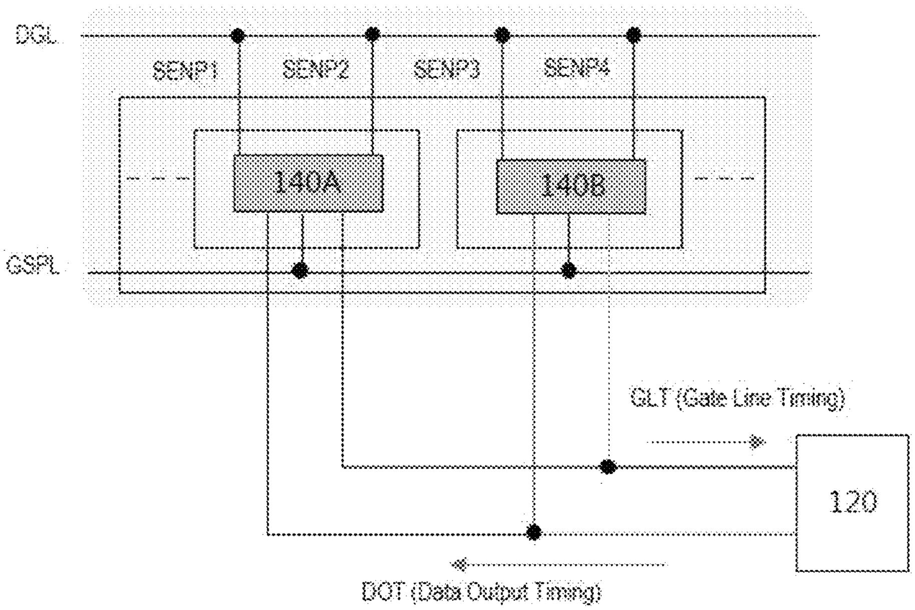
FIG. 9 is an illustrative configuration diagram of a timing controller and data driving units according to the first embodiment.
Figure 10:
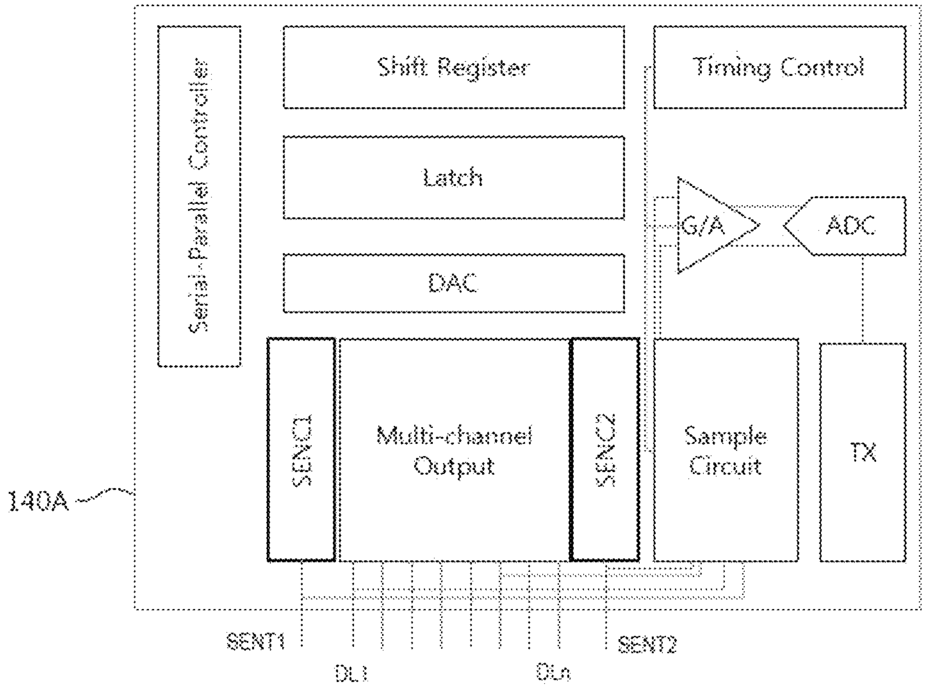
FIG. 10 is an internal block diagram of a first data driving unit illustrated in FIG. 9.

FIG. 9 is an illustrative configuration diagram of the timing controller and the data driving units according to the first embodiment, and FIG. 10 is an internal block diagram of a first data driving unit illustrated in FIG. 9.

As illustrated in FIG. 9, a first data driving unit 140A and a second data driving unit 140B may be electrically connected to a gate start pulse line GSPL through which the gate start pulse GSP is transmitted and to a gate line (or dummy gate line) DGL through which the gate signal is transmitted.

Sensing terminals of the first data driving unit 140A may be connected to a first sensing point SENP1 of the gate line DGL and a second sensing point SENP2 separated from the first sensing point SENP1. In addition, sensing terminals of the second data driving unit 140B may be connected to a third sensing point SENP3 of the gate line DGL and a fourth sensing point SENP4 separated from the third sensing point SENP3. The sensing terminals described herein are described as sensing terminals of the first data driving unit 140A and sensing terminals of the second data driving unit 140B. However, it may be understood that some or all of the sensing terminals (e.g., at least two of the sensing terminals) may alternatively be connected to a separate component of the display device. For instance, some or all of the sensing terminals may be connected to another IC other than the data driving unit, which may act as an intermediary component between the gate line DGL and the data driving unit 140A, 140B and which may relay the sensed signals from the terminals to the data driving unit.

As can be seen from the drawings, the data driving units 140A and 140B may receive a gate start pulse to determine the delay characteristic of the sensed gate signal, and sense the gate signal output from the gate driving unit based on at least two sensing terminals prepared (e.g., which correspond to locations) in a left outermost portion and a right outermost portion respectively. The left and right outermost portions may be outermost portions of a specific data driving unit (e.g., the first data driving unit 140A or the second data driving unit 140B). Alternatively, the at least two sensing terminals may be located at an outermost side of one side and an outermost side of the other side (that is, both ends) of the data driving units 140A and 140B. In this way, the distance between sensed points on the gate line (or dummy gate line) is maximized and the accuracy of sensing of the gate signal is improved.

The data driving units 140A and 140B may transmit the gate line timing information prepared based on the gate start pulse and the sensed gate signal to the timing controller 120 through a gate line timing line GLT.

The timing controller 120 may transmit the data output timing information prepared based on the timing information (gate line timing) to the data driving units 140A and 140B through a data output timing line DOT.

As illustrated in FIG. 10, the first data driving unit 140A may include a serial-parallel controller, a shift register, a latch, a digital-to-analog conversion unit (circuit) DAC, a multi-channel output unit (circuit) Multi-channel Output, a first signal sensing unit (circuit) SENC1, a second signal sensing unit (circuit) SENC2, a timing control unit Timing Control (also referred to as a controller or a timing control), an amplification unit (circuit) G/A, an analog-to-digital conversion unit (circuit) ADC, a sampling circuit unit (circuit) Sample Circuit, a signal transmission unit (circuit) TX, etc. The second data driving unit 140B may have the same configuration as the first data driving unit 140A.

The serial-parallel controller may be configured to perform a function of controlling the shift register and the latch to convert a data signal applied from the outside in a serial system into a parallel system.

The shift register and the latch may be configured to perform a function of converting a data signal applied in a serial system into a parallel system and storing the data signal in response to control of the serial-parallel controller.

The digital-to-analog conversion unit DAC may be configured to perform a function of converting a digital data signal of a parallel system output from the latch into an analog data voltage. The multi-channel output unit Multi-channel Output may be configured to perform a function of outputting an analog data voltage to the data lines DL1 to DLn.

The timing control unit Timing Control may be configured to perform a function of controlling an operation timing of a device included in the first data driving unit 140A.

The sampling circuit unit Sample Circuit may be configured to perform a function of sensing and sampling characteristics of a device included in a subpixel through reference lines disposed together with data lines. The amplification unit G/A may be configured to perform a function of amplifying a sampling value output from the sampling circuit unit Sample Circuit. The analog-to-digital conversion unit ADC may be configured to perform a function of converting an analog sampling value output from the amplification unit G/A into a digital sampling value. The signal transmission unit TX may be configured to perform a function of transmitting a digital sampling value to the timing controller.

The amplification unit G/A, the analog-to-digital conversion unit ADC, the sampling circuit unit Sample Circuit, and the signal transmission unit TX are components for compensating for elements included in the subpixel (for example, a driving transistor, an organic light-emitting diode, etc.), and may be omitted.

The first signal sensing unit SENC1 and the second signal sensing unit SENC2 may be configured to perform a function of sensing a gate signal through a gate line, and preparing and outputting gate line timing information. The first signal sensing unit SENC1 may be configured to sense a first point of the gate line through a first sensing terminal SENT1 connected to a first sensing line, and the second signal sensing unit SENC2 may be configured to sense a second point of the gate line through a second sensing terminal SENT2 connected to a second sensing line.

Hereinafter, a (e.g., large-sized) LED display device, which includes four data driving units and one timing controller and is implemented so that gate signals are applied from the left and right sides, will be described as an example.

Figure 11:
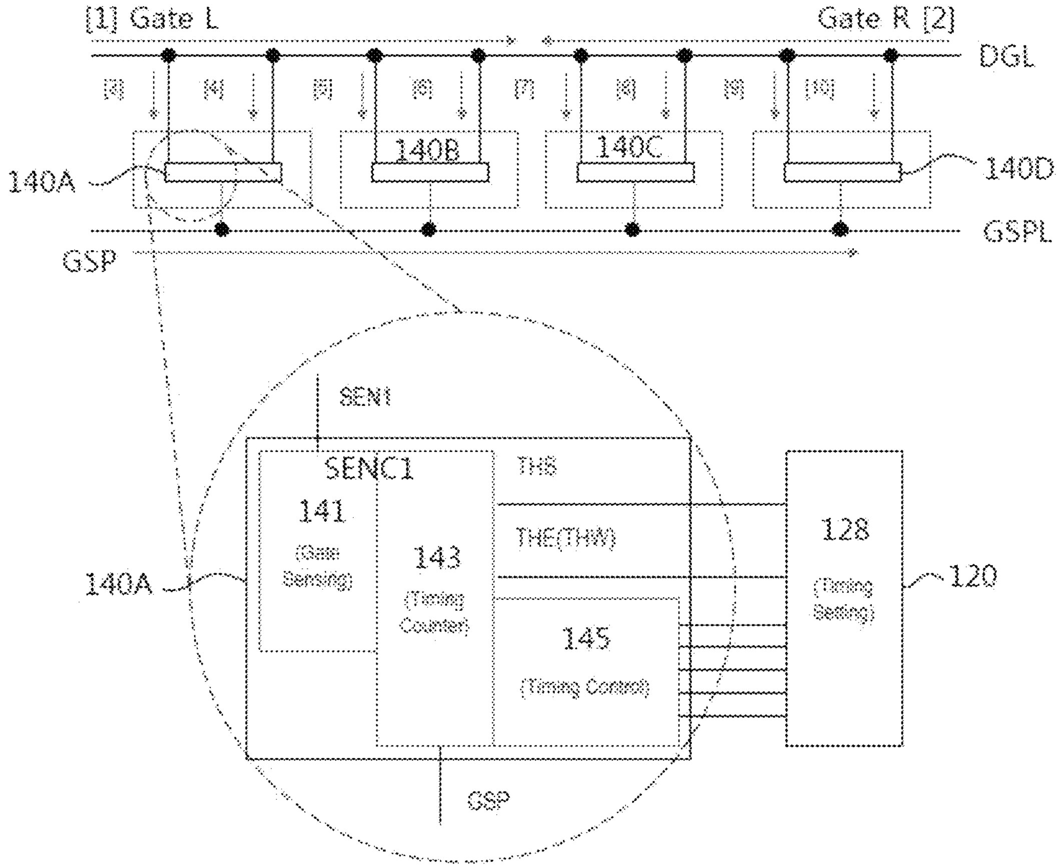
FIG. 11 is a partial configuration diagram of a large-sized LED display device.
Figure 12:
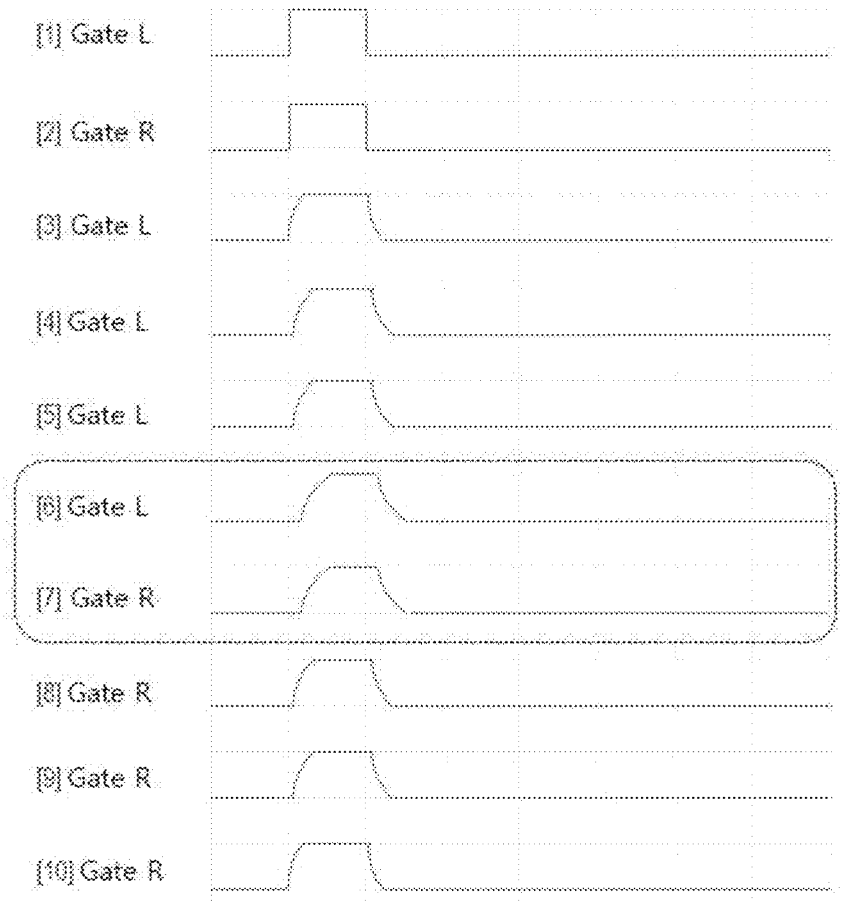
FIG. 12 is an illustrative diagram illustrating a gate signal sensed through a gate line of FIG. 11.
Figure 13:
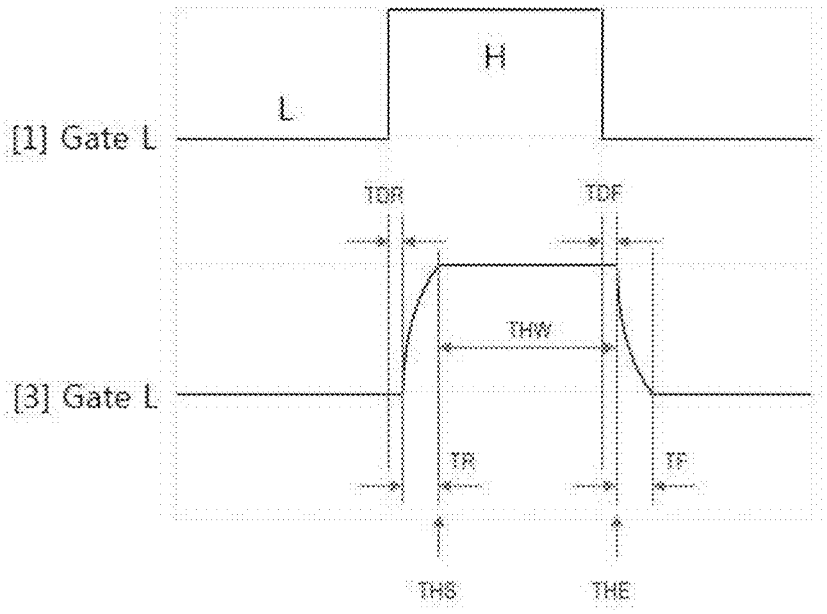
FIG. 13 is an illustrative diagram for describing a delay characteristic of the gate signal based on a part of FIG. 12.

FIG. 11 is a partial configuration diagram of the LED display device, FIG. 12 is an illustrative diagram illustrating a gate signal sensed through the gate line of FIG. 11, and FIG. 13 is an illustrative diagram for describing a delay characteristic of the gate signal based on a part of FIG. 12.

As illustrated in FIGS. 11 to 13, the LED display device may include at least four data driving units 140A to 140D. The first and second data driving units 140A and 140B may apply a data signal to a left display area with respect to a center line of the display panel, and the third and fourth data driving units 140C and 140D may apply a data signal to a right display area with respect to the center line of the display panel.

A dummy gate line DGL transmitting gate signals Gate L and Gate R and a gate start pulse line GSPL transmitting a gate start pulse GSP may be disposed in the display area or the non-display area of the display panel.

The first to fourth data driving units 140A to 140D may be commonly connected to the gate start pulse line GSP. The first data driving unit 140A may sense a first-side gate signal Gate L from a first point and a second point of the dummy gate line DGL. The second data driving unit 140B may sense the first-side gate signal Gate L from a third point and a fourth point of the dummy gate line DGL. The third data driving unit 140C may sense a second-side gate signal Gate R from a fifth point and a sixth point of the dummy gate line DGL. The fourth data driving unit 140D may sense the second-side gate signal Gate R from a seventh point and an eighth point of the dummy gate line DGL.

When a part of the first data driving unit 140A is representatively examined, the first signal sensing unit SENC1 may include a gate signal sensing unit 141 (Gate Sensing) that receives a first sensing signal SEN1 and a timing counter unit 143 (Timing Counter) that receives a gate start pulse GSP. The gate signal sensing unit 141 may be configured to perform a function of sensing a gate signal for the respective point on the gate line DGL. The timing counter unit 143 may be configured to perform a function of counting start and end times of the gate start pulse GSP.

The dummy gate line DGL may simultaneously transmit the first (left) gate signal Gate L output from the gate driving unit disposed in the first (left) non-display area and the second (right) gate signal Gate R output from the gate driving unit disposed in the second (right) non-display area.

However, referring to FIG. 12 and FIG. 11 together, starting from an input point ([1]) to which the first-side gate signal Gate L is applied, the delay characteristic of the gate signal may worsen (i.e., distort or delay) toward a first point ([3]), a second point ([4]), a third point ([5]), and the fourth point ([6]). Conversely, starting from an input point ([2]) to which the second-side gate signal Gate R is applied, the delay characteristic of the gate signal may worsen toward an eighth point ([10]), a seventh point ([9]), a sixth point ([8]), and a fifth point ([7]). That is, the fourth point ([6]) farthest from the input point ([1]) to which the first-side gate signal Gate L is applied, and the fifth point ([7]) farthest from the input point ([2]) to which the second-side gate signal Gate R is applied may be points at which the delay (and/or distortion) characteristic of the gate signal is the worst (i.e., greatest or most pronounced).

Referring to FIGS. 11-13 together, it can be seen that the gate signal sensed from the first point ([3]) may have a delay characteristic compared to the input point ([1]) to which the first-side gate signal Gate L is applied. The second-side gate signal Gate R applied from the opposite side from the first-side gate signal Gate L may have the same characteristic. The first point ([3]) is referenced here for exemplary purposes only and the same or similar delay characteristics may be present in the gate signals sensed at any other point. However, the delay characteristics sensed at the other points may have different values and magnitudes.

Factors that may determine the delay characteristic of the gate signal include TDR (T_Delay Rising), TDF (T_Delay Falling), THS (T_High Start), THE (T_High End), etc., which is described as follows.

TDR may be a factor for determining a time when the gate signal at the first point ([3]) rises from logic low (L) to logic high (H) after having a delay time compared to a logic high start time of the gate signal at the input point ([1]). TDF may be a factor for determining a time when the gate signal at the first point ([3]) falls from logic high (H) to logic low (L) after having a delay time compared to a logic low start time of the gate signal at the input point ([1]). THS may be a factor for determining a logic high (H) start time of the gate signal at the first point ([3]), THE may be a factor for determining a logic high (H) end time of the gate signal at the first point ([3]).

In addition, TR may be a factor for determining a time required for the gate signal at the first point ([3]) to rise from logic low (L) to logic high (H), THW may be a factor for determining a logic high (H) holding time (or pulse width) of the gate signal at the first point ([3]), and TF may be a factor for determining a time required for the gate signal at the first point ([3]) to fall from logic high (H) to logic low (L).

Accordingly, when the gate start pulse GSP indicating the start of output of the gate signal is applied and the gate signal Gate is sensed from a plurality of points, the delay characteristic of the gate signal may be found.

For this reason, it can be understood that the first signal sensing unit SENC1 includes the gate signal sensing unit 141 which can sense the gate signal for each point and the timing counter unit 143, which can sense the gate start pulse. Therefore, the first signal sensing unit SENC1 is able to count the start and end times of the gate start pulse GSP. In addition, it can be understood that the timing controller 120 includes a timing setting unit 128 for providing data output timing information Data Output Timing for automatically correcting a data output timing of the data driving unit 140 based on the delay characteristic of the gate signal. For example, the data output timing may be corrected based on THS and THE (or THW), etc., or any of the other characteristics shown in FIG. 13 for determining the delay characteristic of the gate signal.

Hereinafter, various examples of the signal sensing unit (e.g., signal sensing unit SENC1 in FIG. 11) for determining the delay characteristic of the gate signal will be described.

Figure 14:
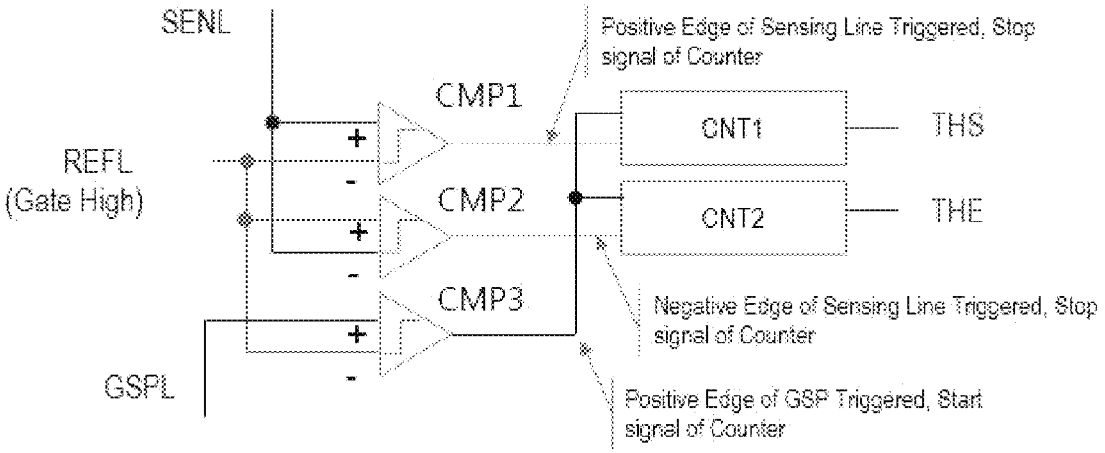
FIG. 14 is a first illustrative diagram illustrating a configuration of a signal sensing unit.
Figure 15:
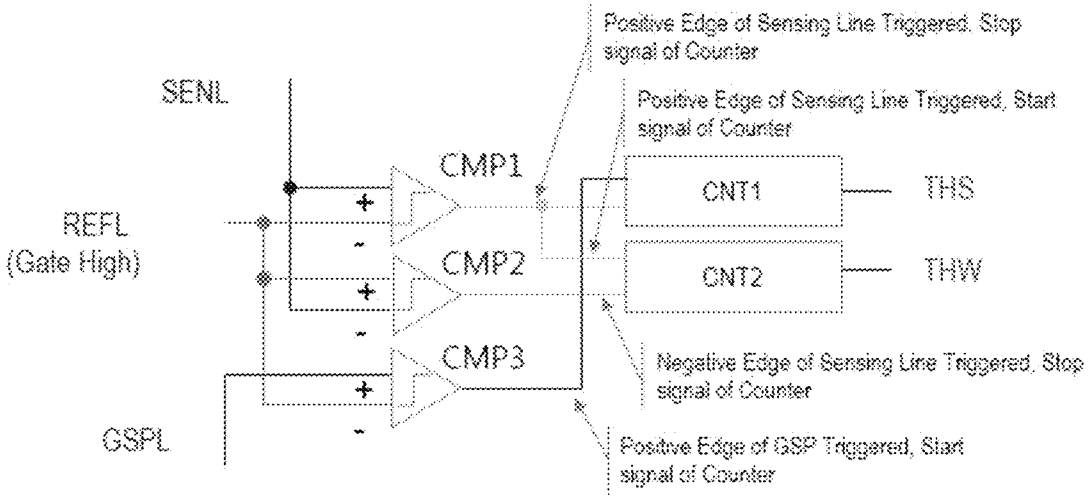
FIG. 15 is a second illustrative diagram illustrating a configuration of the signal sensing unit.
Figure 16:
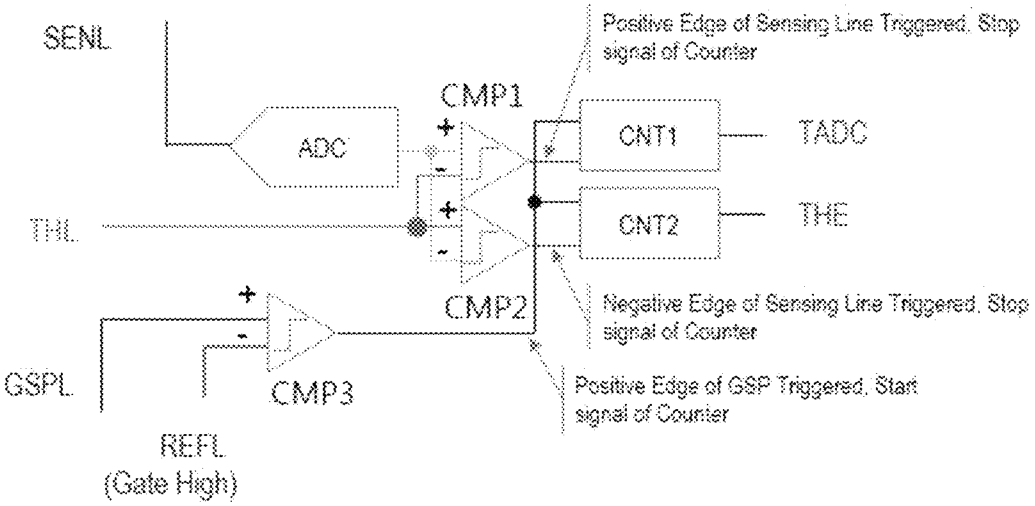
FIG. 16 is a third illustrative diagram illustrating a configuration of the signal sensing unit.
Figure 17:
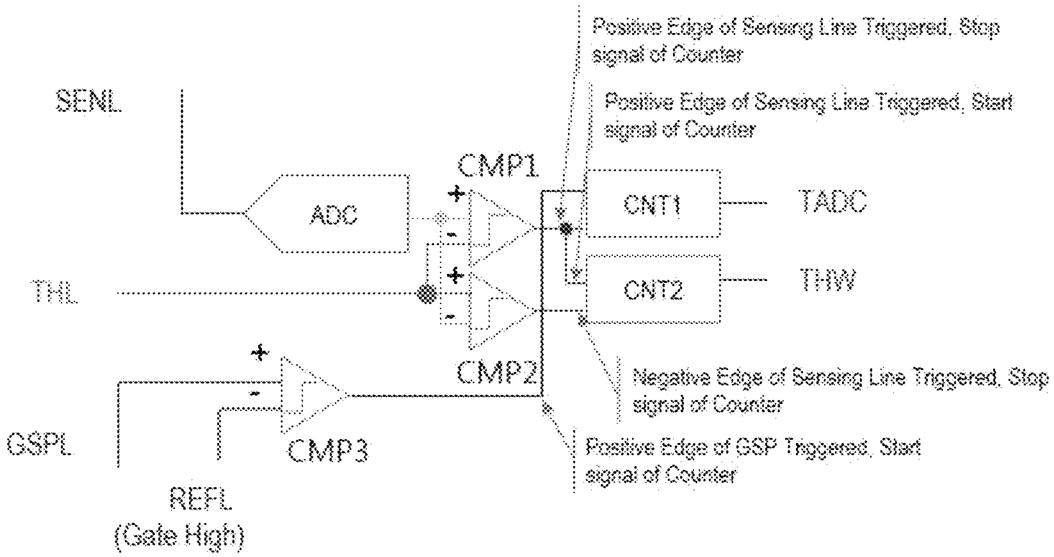
FIG. 17 is a fourth illustrative diagram illustrating a configuration of the signal sensing unit.

FIG. 14 is a first illustrative diagram illustrating a configuration of the signal sensing unit, FIG. 15 is a second illustrative diagram illustrating a configuration of the signal sensing unit, FIG. 16 is a third illustrative diagram illustrating a configuration of the signal sensing unit, and FIG. 17 is a fourth illustrative diagram illustrating a configuration of the signal sensing unit.

As illustrated in FIG. 14, the signal sensing units (circuits) SENC1, SENC2 may include first to third comparators CMP1, CMP2, and CMP3, and the timing counter units (circuits) 143 may include first and second counter units CNT1 and CNT2. That is, the first and second signal sensing units SENC1, SENC2 may each include three comparators and two counters.

The first comparator CMP1 may have a non-inverting terminal (+) connected to a sensing line SENL, an inverting terminal (−) connected to a reference line REFL, and an output terminal connected to a first input terminal of the first counter unit CNT1. The reference line REFL may be connected to a voltage source capable of maintaining the same level as the gate high of the gate signal. An output of the first comparator CMP1 may be used as a signal capable of generating a trigger at a positive edge of the sensing line (Positive Edge of Sensing Line Triggered). A positive edge of the sensing line, as used herein, may be interpreted to mean a time at which the signal in the sensing line transitions from a logic low to a logic high or from an off signal to an on signal.

The second comparator CMP2 may have an inverting terminal (−) connected to the sensing line SENL, a non-inverting terminal (+) connected to the reference line REFL, and an output terminal connected to a first input terminal of the second counter unit CNT2. An output of the second comparator CMP2 may be used as a signal capable of generating a trigger at a negative edge of the sensing line (Negative Edge of Sensing Line Triggered). A negative edge of the sensing line, as used herein, may be interpreted to mean a time at which the signal in the sensing line transitions from a logic high to a logic low or from an on signal to an off signal.

The third comparator CMP3 may have an inverting terminal (−) connected to the reference line REFL, a non-inverting terminal (+) connected to the gate start pulse line GSPL, and an output terminal connected to a second input terminal of the first counter unit CNT1 and a second input terminal of the second counter unit CNT2. An output of the third comparator CMP3 may be used as a signal capable of generating a trigger at a positive edge of the gate start pulse (Positive Edge of GSP Triggered).

The first counter unit CNT1 may generate and output a signal THS for determining a logic high start time of the gate signal using a method of starting counting based on an output of the third comparator CMP3 and suspending counting based on an output of the first comparator CMP1.

The second counter unit CNT2 may generate and output a signal THE for determining a logic high end time of the gate signal using a method of starting counting based on an output of the third comparator CMP3 and suspending counting based on an output of the second comparator CMP2.

As illustrated in FIG. 15, the gate signal sensing units 141 may include first to third comparators CMP1, CMP2, and CMP3, and the timing counter units CNT1 and CNT2 may include first and second counter units CNT1 and CNT2. That is, each of the first and second signal sensing units SENC1, SENC2 may include three comparators and two counters.

The first comparator CMP1 may have a non-inverting terminal (+) connected to a sensing line SENL, an inverting terminal (−) connected to a reference line REFL, and an output terminal connected to a first input terminal of the first counter unit CNT1 and a second input terminal of the second counter unit CNT2. The reference line REFL may be connected to a voltage source capable of maintaining the same level as the gate high of the gate signal. An output of the first comparator CMP1 may be used as a signal capable of generating a trigger at a positive edge of the sensing line (Positive Edge of Sensing Line Triggered).

The second comparator CMP2 may have an inverting terminal (−) connected to the sensing line SENL, a non-inverting terminal (+) connected to the reference line REFL, and an output terminal connected to a first input terminal of the second counter unit CNT2. An output of the second comparator CMP2 may be used as a signal capable of generating a trigger at a negative edge of the sensing line (Negative Edge of Sensing Line Triggered).

The third comparator CMP3 may have an inverting terminal (−) connected to the reference line REFL, a non-inverting terminal (+) connected to the gate start pulse line GSPL, and an output terminal connected to a second input terminal of the first counter unit CNT1. An output of the third comparator CMP3 may be used as a signal capable of generating a trigger at a positive edge of the gate start pulse (Positive Edge of GSP Triggered).

The first counter unit CNT1 may generate and output a signal THS for determining a logic high start time of the gate signal using a method of starting counting based on an output of the third comparator CMP3 and suspending counting based on an output of the first comparator CMP1.

The second counter unit CNT2 may generate and output a signal THW for determining a logic high (H) holding time (or pulse width) of the gate signal using a method of starting counting based on an output of the first comparator CMP1 and suspending counting based on an output of the second comparator CMP2.

As illustrated in FIG. 16, the gate signal sensing units 141 may include first to third comparators CMP1, CMP2, and CMP3 along with an analog-to-digital conversion unit ADC, and the timing counter units CNT1 and CNT2 may include first and second counter units CNT1 and CNT2. That is, the first and second signal sensing units SENC1, SENC2 may include one analog-to-digital conversion unit, three comparators, and two counters.

The analog-to-digital conversion unit ADC may have an input terminal connected to a sensing line SENL, and an output terminal connected to a non-inverting terminal (+) of the first comparator CMP1 and an inverting terminal (−) of the second comparator CMP2. The analog-to-digital conversion unit ADC may output 0 or 1 corresponding to a logic state of the gate signal.

The first comparator CMP1 may have a non-inverting terminal (+) connected to the output terminal of the analog-to-digital conversion unit ADC, an inverting terminal (−) connected to a threshold voltage line THL, and an output terminal connected to a first input terminal of the first counter unit CNT1. The threshold voltage line THL may be connected to a device capable of applying a signal equal to logic high 1. An output of the first comparator CMP1 may be used as a signal capable of generating a trigger at a positive edge of the sensing line (Positive Edge of Sensing Line Triggered).

The second comparator CMP2 may have an inverting terminal (−) connected to the output terminal of the analog-to-digital conversion unit ADC, a non-inverting terminal (+) connected to a threshold voltage line THL, and an output terminal connected to a first input terminal of the second counter unit CNT2. An output of the second comparator CMP2 may be used as a signal capable of generating a trigger at a negative edge of the sensing line (Negative Edge of Sensing Line Triggered).

The third comparator CMP3 may have an inverting terminal (−) connected to a reference line REFL, a non-inverting terminal (+) connected to a gate start pulse line GSPL, and an output terminal connected to a second input terminal of the first counter unit CNT1 and a second input terminal of the second counter unit CNT2. An output of the third comparator CMP3 may be used as a signal capable of generating a trigger at a positive edge of the gate start pulse (Positive Edge of GSP Triggered).

The first counter unit CNT1 may generate and output a signal TADC obtained by digitizing a gate signal using a method of starting counting based on an output of the third comparator CMP3 and suspending counting based on an output of the first comparator CMP1.

The second counter unit CNT2 may generate and output the signal THE for determining the logic high end time of the gate signal using a method of starting counting based on an output of the third comparator CMP3 and suspending counting based on an output of the second comparator CMP2.

As illustrated in FIG. 17, the gate signal sensing units 141 may include first to third comparators CMP1, CMP2, CMP3 along with an analog-to-digital conversion unit ADC, and the timing counter units CNT1 and CNT2 may include first and second counter units CNT1 and CNT2. That is, the first and second signal sensing units SENC1, SENC2 may include one analog-to-digital conversion unit, three comparators, and two counters.

The analog-to-digital conversion unit ADC may have an input terminal connected to the sensing line SENL, and an output terminal connected to a non-inverting terminal (+) of the first comparator CMP1 and an inverting terminal (−) of the second comparator CMP2. The analog-to-digital conversion unit ADC may output 0 or 1 corresponding to a logic state of the gate signal.

The first comparator CMP1 may have a non-inverting terminal (+) connected to an output terminal of the analog-to-digital conversion unit ADC, an inverting terminal (−) connected to a threshold voltage line THL, and an output terminal connected to a first input terminal of the first counter unit CNT1 and a second input terminal of the second counter unit CNT2. The threshold voltage line THL may be connected to a device capable of applying a signal equal to logic high 1. An output of the first comparator CMP1 may be used as a signal capable of generating a trigger at a positive edge of the sensing line (Positive Edge of Sensing Line Triggered).

The second comparator CMP2 may have an inverting terminal (−) connected to an output terminal of the analog-to-digital conversion unit ADC, a non-inverting terminal (+) connected to the threshold voltage line THL, and an output terminal connected to a first input terminal of the second counter unit CNT2. An output of the second comparator CMP2 may be used as a signal capable of generating a trigger at a negative edge of the sensing line (Negative Edge of Sensing Line Triggered).

The third comparator CMP3 may have an inverting terminal (−) connected to the reference line REFL, a non-inverting terminal (+) connected to the gate start pulse line GSPL, and an output terminal connected to a second input terminal of the first counter unit CNT1 and a second input terminal of the second counter unit CNT2. An output of the third comparator CMP3 may be used as a signal capable of generating a trigger at a positive edge of the gate start pulse (Positive Edge of GSP Triggered).

The first counter unit CNT1 may generate and output a signal TADC obtained by digitizing a gate signal using a method of starting counting based on an output of the third comparator CMP3 and suspending counting based on an output of the first comparator CMP1.

The second counter unit CNT2 may generate and output a signal THW for determining a logic high (H) holding time (or pulse width) of a gate signal using a method of starting counting based on an output of the first comparator CMP1 and suspending counting based on an output of the second comparator CMP2.

Hereinafter, a description will be given of a second embodiment in which a timing setting unit for preparing data output timing information, etc. is included in the data driving unit.

Figure 18:
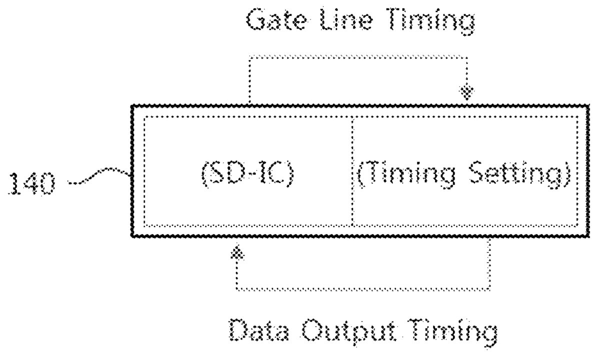
FIG. 18 is an illustrative diagram illustrating a data driving unit including a timing setting unit according to a second embodiment.
Figure 19:
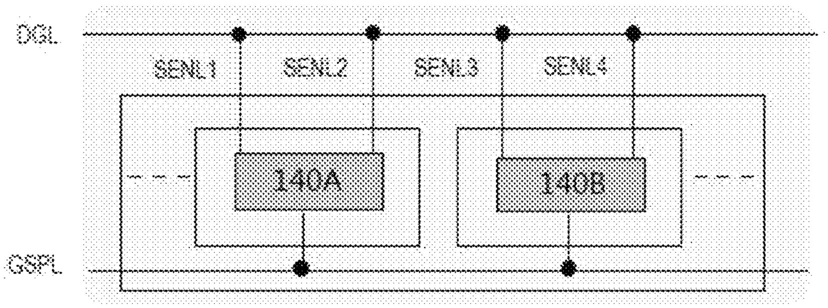
FIG. 19 is an illustrative configuration diagram of data driving units according to the second embodiment.
Figure 20:
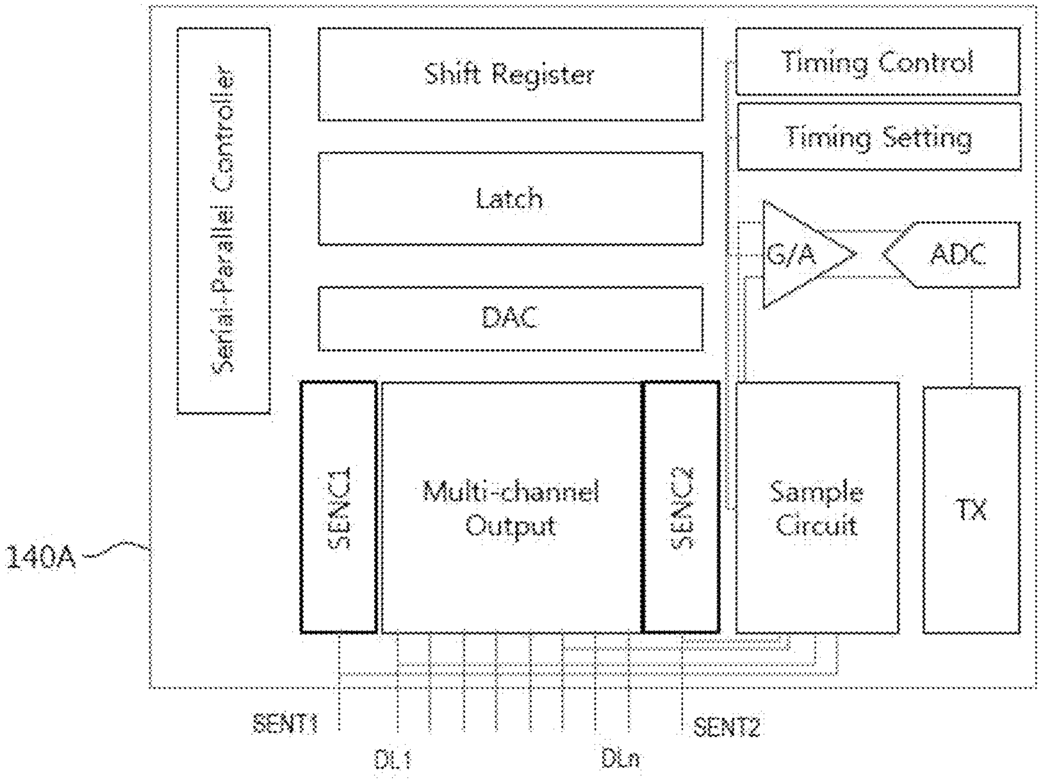
FIG. 20 is an internal block diagram of a first data driving unit illustrated in FIG. 19.
Figure 21:
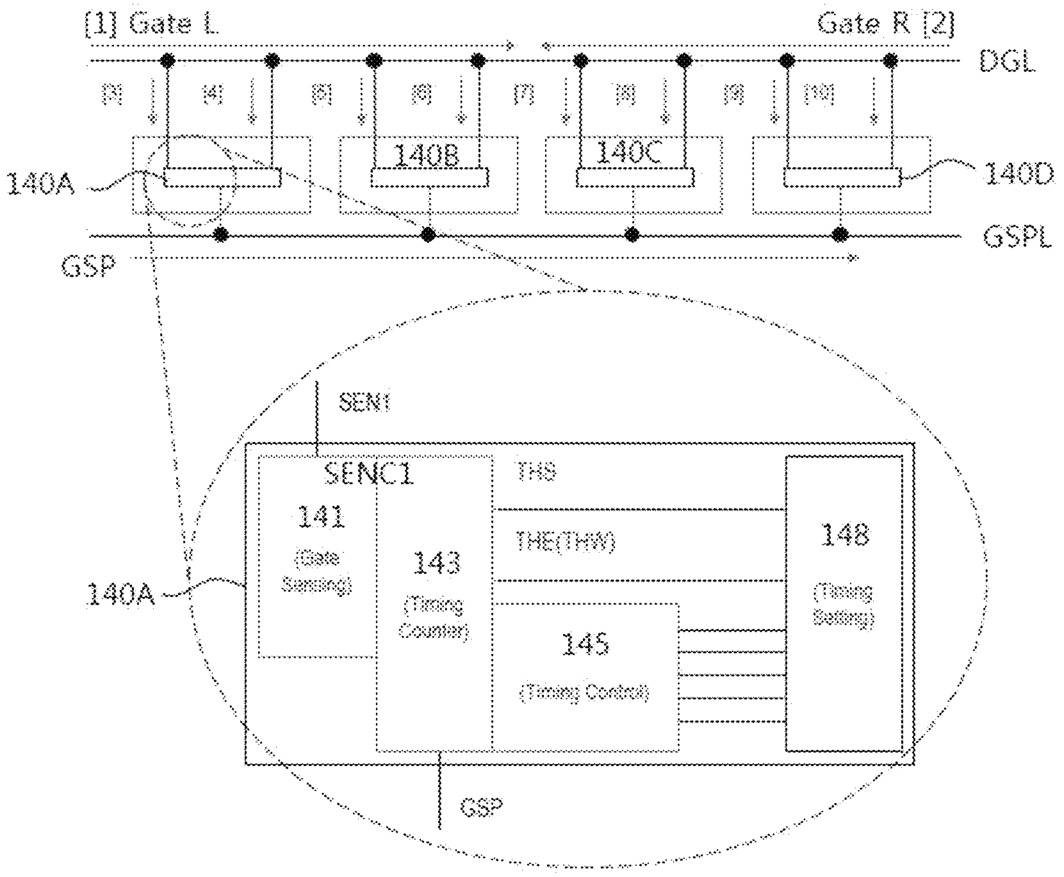
FIG. 21 is a partial configuration diagram of a large-sized LED display device.

FIG. 18 is an illustrative diagram illustrating a data driving unit including a timing setting unit according to the second embodiment, FIG. 19 is an illustrative configuration diagram of data driving units according to the second embodiment, FIG. 20 is an internal block diagram of a first data driving unit illustrated in FIG. 19, and FIG. 21 is a partial configuration diagram of a (e.g., large-sized) LED display device.

As illustrated in FIG. 18, the data driving unit 140 may further include a timing setting unit Timing Setting for providing data output timing information for automatically correcting the data output timing of the data driving unit 140 based on the gate line timing information transmitted from the data driving unit, unlike the first embodiment in which the a time setting unit in the timing controller 120 is used for this purpose. As illustrated in FIG. 19, even when the timing setting unit Timing Setting, etc. is further included, the first data driving unit 140A and the second data driving unit 140B may be electrically connected to the gate line (or dummy gate line) DGL through which the gate signal is transmitted along with the gate start pulse line GSPL through which the gate start pulse GSP is transmitted.

As illustrated in FIG. 20, as in the first embodiment, the first data driving unit 140A may include a serial-parallel controller, a shift register, a latch, a digital-to-analog conversion unit DAC, a multi-channel output unit Multi-channel Output, a first signal sensing unit SENC1, a second signal sensing unit SENC2, a controller (e.g. timing control unit) Timing Control, an amplification unit G/A, an analog-to-digital conversion unit ADC, a sampling circuit unit Sample Circuit, a signal transmission unit TX, etc. However, unlike the first embodiment, the first data driving unit 140A may include a timing setting unit Timing Setting. In the embodiment shown in FIG. 20, the second data driving unit 140B may have the same configuration as the first data driving unit 140A.

As illustrated in FIG. 21, when implemented as a large-sized LED display device, at least four data driving units 140A to 140D may be included as in the first embodiment. The first and second data driving units 140A and 140B may apply a data signal to a left display area with respect to a center line of the display panel, and the third and fourth data driving units 140C and 140D may apply a data signal to a right display area with respect to the center line of the display panel.

As in the first embodiment, the first signal sensing unit SENC1 may include a gate signal sensing unit 141 (Gate Sensing) that receives a first sensing signal SEN1 and a timing counter unit 143 (Timing Counter) that receives a gate start pulse GSP. In addition, the second signal sensing unit SENC1 may have the same configuration as that of the first signal sensing unit SENC1.

Hereinafter, a description will be given of a method of driving the LED display device according to the second embodiment.

Figure 22:
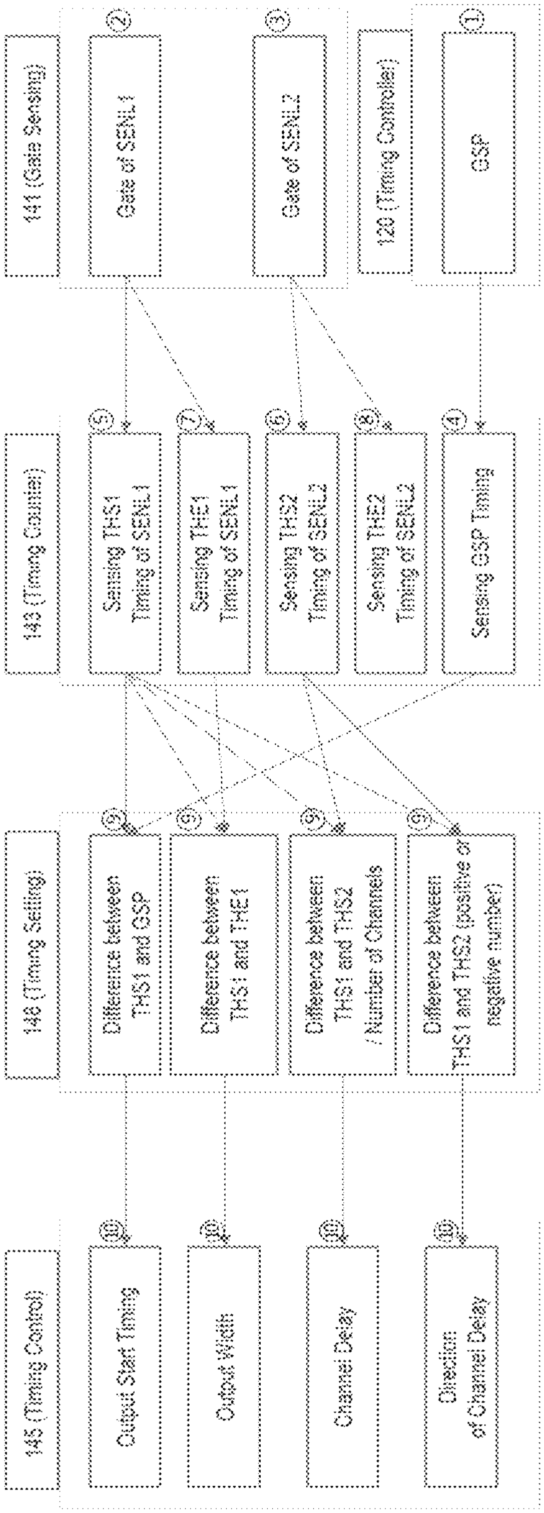
FIG. 22 is a diagram for describing a method of driving the LED display device according to the second embodiment.

FIG. 22 is a diagram for describing a method of driving the LED display device according to the first or second embodiment. In FIG. 22, noted that the order ① to ⑩ is described in order to assist in understanding related to a flow of the driving method. However, the steps ① to ⑩ need not be carried out in the order in which they are described. In addition, it is described that, while parallel control is performed at the same time in the timing setting unit 148 and the timing control unit 145 (also referred to as a controller or a timing control) of the data driving unit, serial control is performed at different times in the gate signal sensing unit 141 and the timing counter unit 143, which should be interpreted as an example for better understanding. That is, the control method performed within the same configuration may be performed at the same time or at different times depending on the device configuration, algorithm, reaction speed, etc.

As illustrated in FIG. 22, first (①), the gate start pulse GSP may be output from the timing controller 120. Next (②), a first point of the gate line may be sensed through the first sensing line SENL1 connected to the gate signal sensing unit 141 of the data driving unit. Next (③), a second point of the gate line may be sensed through the second sensing line SENL2 connected to the gate signal sensing unit 141 of the data driving unit.

Next (④), the gate start pulse GSP (e.g., a gate start pulse timing) may be sensed by the timing counter unit 143 of the data driving unit. Next (5), a logic high start time THS1 of the gate signal at the first point may be sensed from the first point of the gate line by the timing counter unit 143 of the data driving unit. Next (⑥), a logic high start time THS2 of the gate signal at the second point may be sensed from the second point of the gate line by the timing counter unit 143 of the data driving unit. Next (⑦), a logic high end time THE1 of the gate signal at the first point may be sensed from the first point of the gate line by the timing counter unit 143 of the data driving unit. Next (⑧), a logic high end time THE2 of the gate signal at the second point may be sensed from the second point of the gate line by the timing counter unit 143 of the data driving unit.

Next (⑨), a difference between the logic high start time THS1 of the gate signal at the first point and the gate start pulse GSP may be calculated by the timing setting unit 148 of the data driving unit. At the same time (⑨), a difference between the logic high start time THS1 of the gate signal at the first point and the logic high end time THE1 of the gate signal at the first point may be calculated by the timing setting unit 148 of the data driving unit. At the same time (⑨), a difference between the logic high start time THS1 of the gate signal at the first point and the logic high start time THS2 of the gate signal at the second point may be divided by the number of output channels of the data driving unit by the timing setting unit 148 of the data driving unit. At the same time (⑨), a difference between the logic high start time THS1 of the gate signal at the first point and the logic high start time THS2 of the gate signal at the second point may be calculated by the timing setting unit 148 of the data driving unit. In this instance, a delay value according to an output channel direction of the data driving unit may be determined depending on whether a difference between the two values is a positive number or a negative number.

Next (⑩), the timing control unit 145 of the data driving unit may control a data output start timing Output Start Timing based on the difference between the logic high start time THS1 of the gate signal at the first point and the gate start pulse GSP. At the same time (⑩), the timing control unit 145 of the data driving unit may control a data output width Output Width based on the difference between the logic high start time THS1 of the gate signal at the first point and the logic high end time THE1 of the gate signal at the first point. At the same time (⑩), the timing control unit 145 of the data driving unit may control a delay value between data output channels Channel Delay based on a value obtained by dividing the difference between the logic high start time THS1 of the gate signal at the first point and the logic high start time THS2 of the gate signal at the second point by the number of output channels of the data driving unit. At the same time (⑩), the timing control unit 145 of the data driving unit may control a delay value Direction of Channel Delay according to an output channel direction of the data driving unit based on the difference between the logic high start time THS1 of the gate signal at the first point and the logic high start time THS2 of the gate signal at the second point. For example, when a positive number is obtained as the difference between the two values, the delay value increases. However, when a negative number is obtained, the delay value may decrease. Accordingly, while the delay value increases from the first point ([3]) to the second point ([4]) of FIG. 21, the delay value may decrease from the eighth point ([10]) to the seventh point ([9]).

As described above, in the second embodiment, a method of automatically correcting the data output timing of the data driving unit after sensing the delay characteristic for each position of the gate signal based on the gate start pulse GSP has been described as an example.

However, embodiments may utilize a source output activation signal (SOE, a signal to activate output of a data signal) output from the timing controller 120 and applied to the data driving unit instead of the gate start pulse GSP. For instance, the source output activation signal (SOE) may be a signal that controls the output of a data driving unit to be transmitted to a pixel. Here, the output of the data driving unit starts at the source output activation signal (SOE) start time and the output width is based on the width of the source output activation signal (SOE). In addition, the embodiments may utilize a data output signal EPI Data (hereinafter, interface data output signal) through an interface coupled between the timing controller 120 and the data driving unit instead of the gate start pulse GSP. For instance, the data output signal (EPI Data) may be a signal that determines the voltage output from a data driving unit, where the level of the data driving unit's output voltage is determined according to the interface data output signal (EPI Data). The source output activation signal (SOE) may, in some implementations, be implemented as a data packet in the data output signal (EPI Data). Accordingly, third and fourth embodiments will be described below using an example in which a source output activation signal SOE or the interface data output signal EPI Data is utilized.

Meanwhile, when the source output activation signal SOE or the interface data output signal EPI Data is utilized, sensing of the gate signal or the gate start pulse may be omitted. However, sensing at least the gate signal may increase accuracy of the output timing. Hereinafter, a description will be given using an example in which sensing of the gate signal is included.

Figure 23:
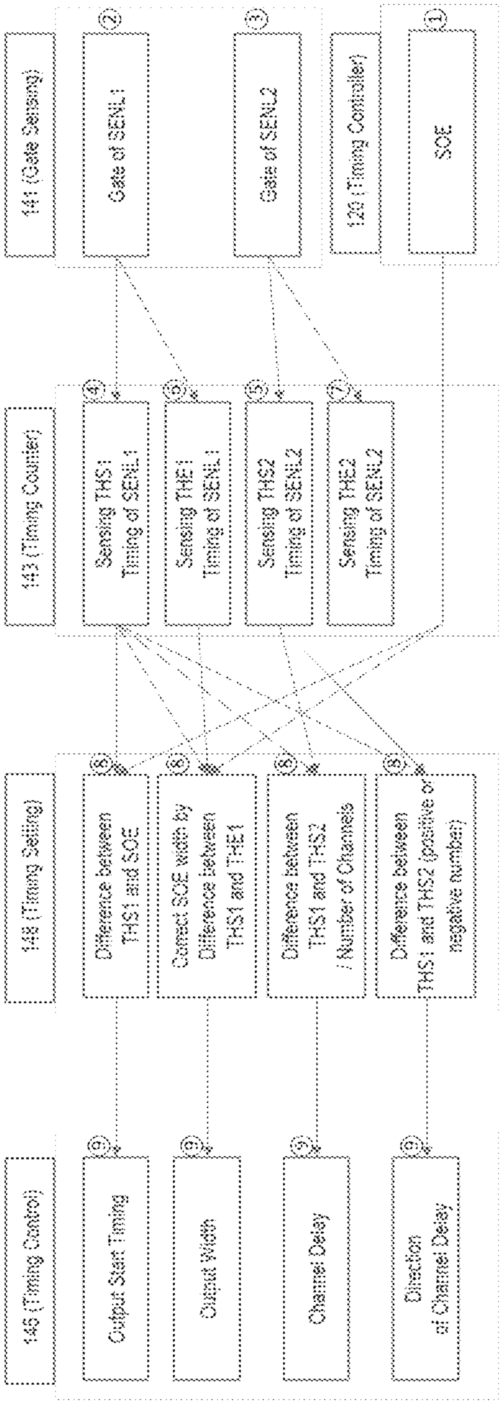
FIG. 23 is a diagram for describing a method of driving an LED display device according to a third embodiment.

FIG. 23 is a diagram for describing a method of driving an LED display device according to the third embodiment. Note that the order ① to ⑩ is described in order to assist in understanding related to a flow of the driving method.

Meanwhile, the third embodiment is different from the second embodiment in that the gate start pulse GSP is replaced with the source output activation signal SOE, and only the related parts will be described. However, the steps ① to ⑩ need not be carried out in the order in which they are described.

As illustrated in FIG. 23, first (①) the source output activation signal SOE may be output from the timing controller 120. Next (②), the first point of the gate line may be sensed through the first sensing line SENL1 connected to the gate signal sensing unit 141 of the data driving unit. Next (③), the second point of the gate line may be sensed through the second sensing line SENL2 connected to the gate signal sensing unit 141 of the data driving unit.

Next (④), the logic high start time THS1 of the gate signal at the first point may be sensed from the first point of the gate line by the timing counter unit 143 of the data driving unit. Next (⑤), the logic high start time THS2 of the gate signal at the second point may be sensed from the second point of the gate line by the timing counter unit 143 of the data driving unit. Next (⑥), the logic high end time THE1 of the gate signal at the first point may be sensed from the first point of the gate line by the timing counter unit 143 of the data driving unit. Next (⑦), the logic high end time THE2 of the gate signal at the second point may be sensed from the second point of the gate line by the timing counter unit 143 of the data driving unit.

Next (⑧), a difference between the logic high start time THS1 of the gate signal at the first point and the source output activation signal SOE may be calculated by the timing setting unit 148 of the data driving unit. At the same time (⑧), the width of the source output activation signal SOE may be corrected by (and based on) a difference between the logic high start time THS1 of the gate signal at the first point and the logic high end time THE1 of the gate signal at the first point by the timing setting unit 148 of the data driving unit. At the same time (⑧), a difference between the logic high start time THS1 of the gate signal at the first point and the logic high start time THS2 of the gate signal at the second point may be divided by the number of output channels of the data driving unit by the timing setting unit 148 of the data driving unit. At the same time (⑧), a difference between the logic high start time THS1 of the gate signal at the first point and the logic high start time THS2 of the gate signal at the second point may be calculated by the timing setting unit 148 of the data driving unit.

Next (⑨), the timing control unit 145 of the data driving unit may control a data output width Output Width based on the corrected width of the source output activation signal SOE. As can be seen from the above flow, when the source output activation signal SOE is utilized, it is unnecessary to sense the gate start pulse GSP. Accordingly, the data driving unit may omit a terminal for receiving the gate start pulse GSP and omit a step for sensing the gate start pulse GSP. The omission of the terminal for receiving the gate start pulse may simplify manufacturing and reduce the cost of the display device.

Figure 24:
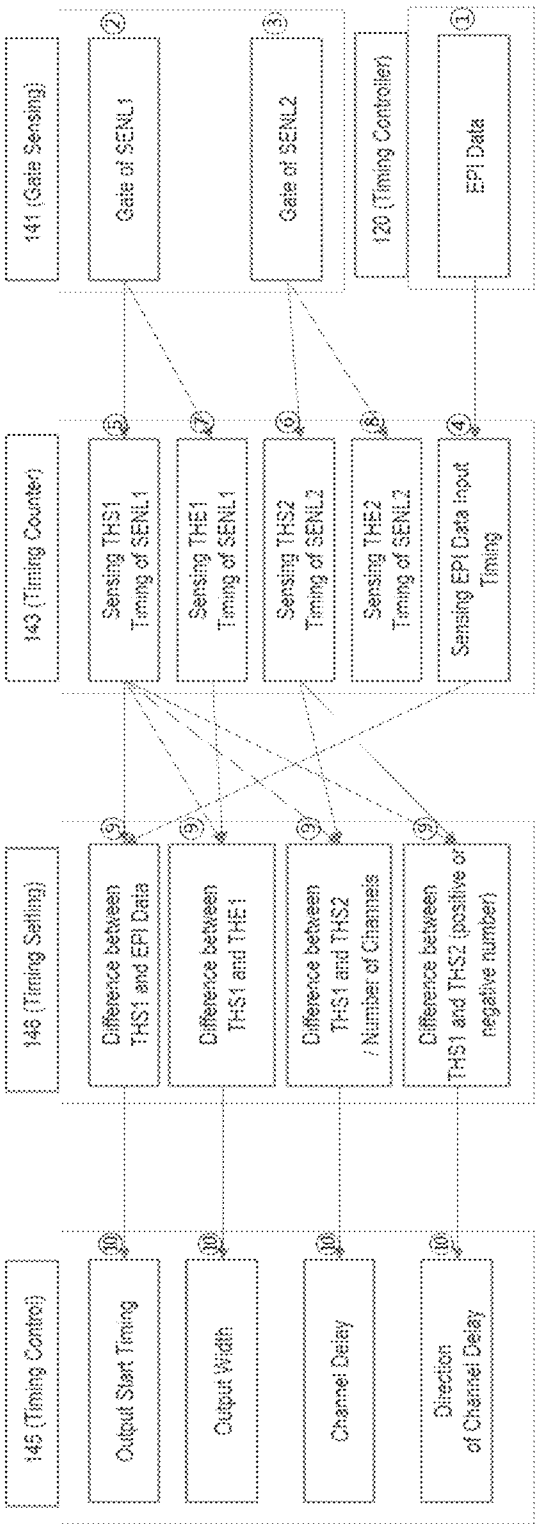
FIG. 24 is a diagram for describing a method of driving an LED display device according to a fourth embodiment.

FIG. 24 is a diagram for describing a method of driving an LED display device according to the fourth embodiment. Note that, in FIG. 24, the order ① to ⑨ is described in order to assist in understanding related to a flow of the driving method. Meanwhile, the fourth embodiment is different from the second embodiment in that the gate start pulse GSP is replaced with the interface data output signal EPI Data, and only the related parts will be described. However, the steps ① to ⑨ need not be carried out in the order in which they are described. Similarly to above, replacing the gate start pulse GSP with the interface data output signal EPI Data avoids the need to sense the gate start pulse GSP and provide a terminal for receiving the gate start pulse GSP.

As illustrated in FIG. 24, first (①), an interface data output signal EPI Data may be generated from the timing controller 120. Next (②), the first point of the gate line may be sensed through the first sensing line SENL1 connected to the gate signal sensing unit 141 of the data driving unit. Next (③), the second point of the gate line may be sensed through the second sensing line SENL2 connected to the gate signal sensing unit 141 of the data driving unit.

Next (④), the input timing of the interface data output signal EPI Data may be sensed by the timing counter unit 143 of the data driving unit. Next (⑤), the logic high start time THS1 of the gate signal at the first point may be sensed from the first point of the gate line by the timing counter unit 143 of the data driving unit. Next (⑥), the logic high start time THS2 of the gate signal at the second point may be sensed from the second point of the gate line by the timing counter unit 143 of the data driving unit. Next (⑦), the logic high end time THE1 of the gate signal at the first point may be sensed from the first point of the gate line by the timing counter unit 143 of the data driving unit. Next (⑧), the logic high end time THE2 of the gate signal at the second point may be sensed from the second point of the gate line by the timing counter unit 143 of the data driving unit.

Next (⑨), a difference between the logic high start time THS1 of the gate signal at the first point and the input timing of the interface data output signal EPI Data may be calculated by the timing setting unit 148 of the data driving unit. Next (⑩), the timing control unit 145 of the data driving unit may control the data output start timing Output Start Timing based on a difference between the logic high start time THS1 of the gate signal at the first point and the input timing of the interface data output signal EPI Data.

Hereinafter, a description will be given of a fifth embodiment in which data output delay information may be exchanged between data driving units based on a delay pulse line (or an additionally prepared signal line to perform a function similar to the delay pulse line).

Figure 25:
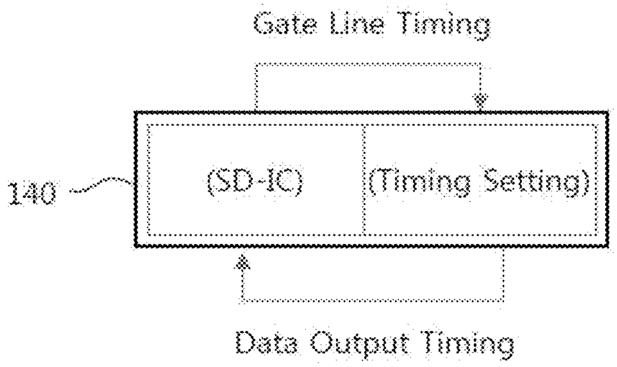
FIG. 25 is an illustrative diagram illustrating a data driving unit including a timing setting unit according to a fifth embodiment.
Figure 26:
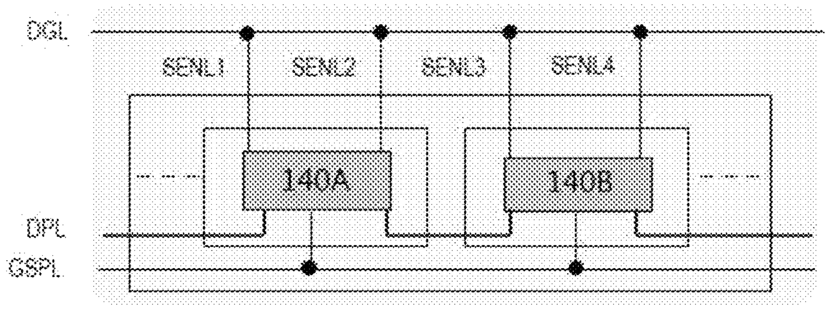
FIG. 26 is an illustrative configuration diagram of data driving units connected by a delay pulse line according to the fifth embodiment.
Figure 27:
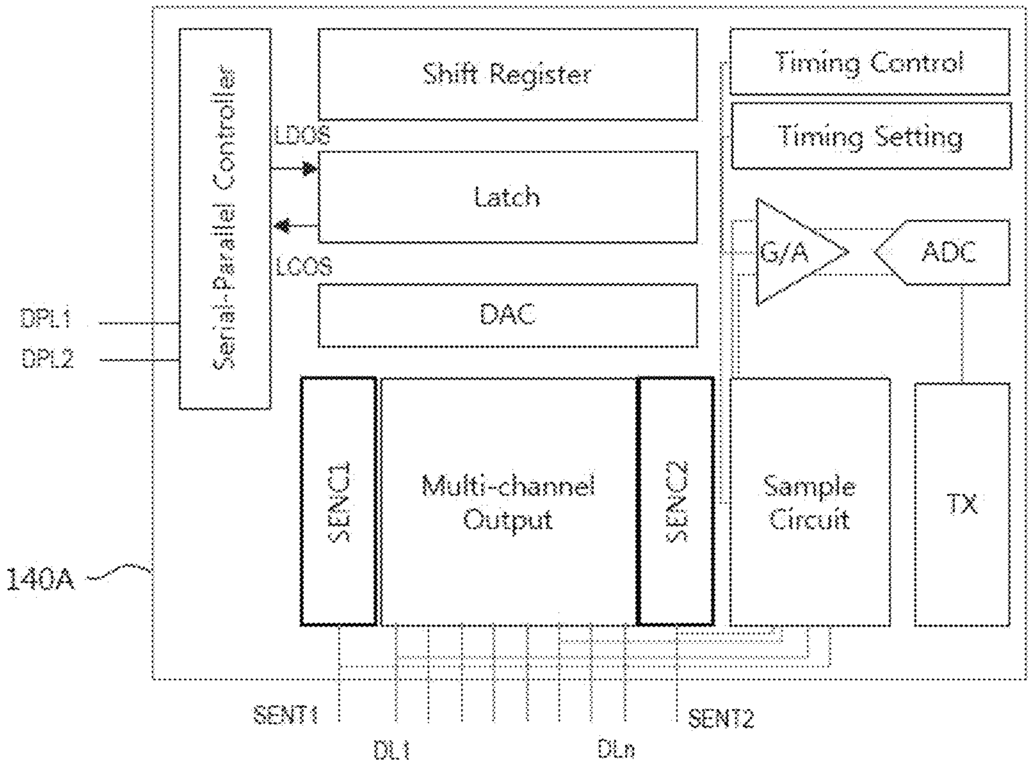
FIG. 27 is an internal block diagram of a first data driving unit illustrated in FIG. 26.
Figure 28:
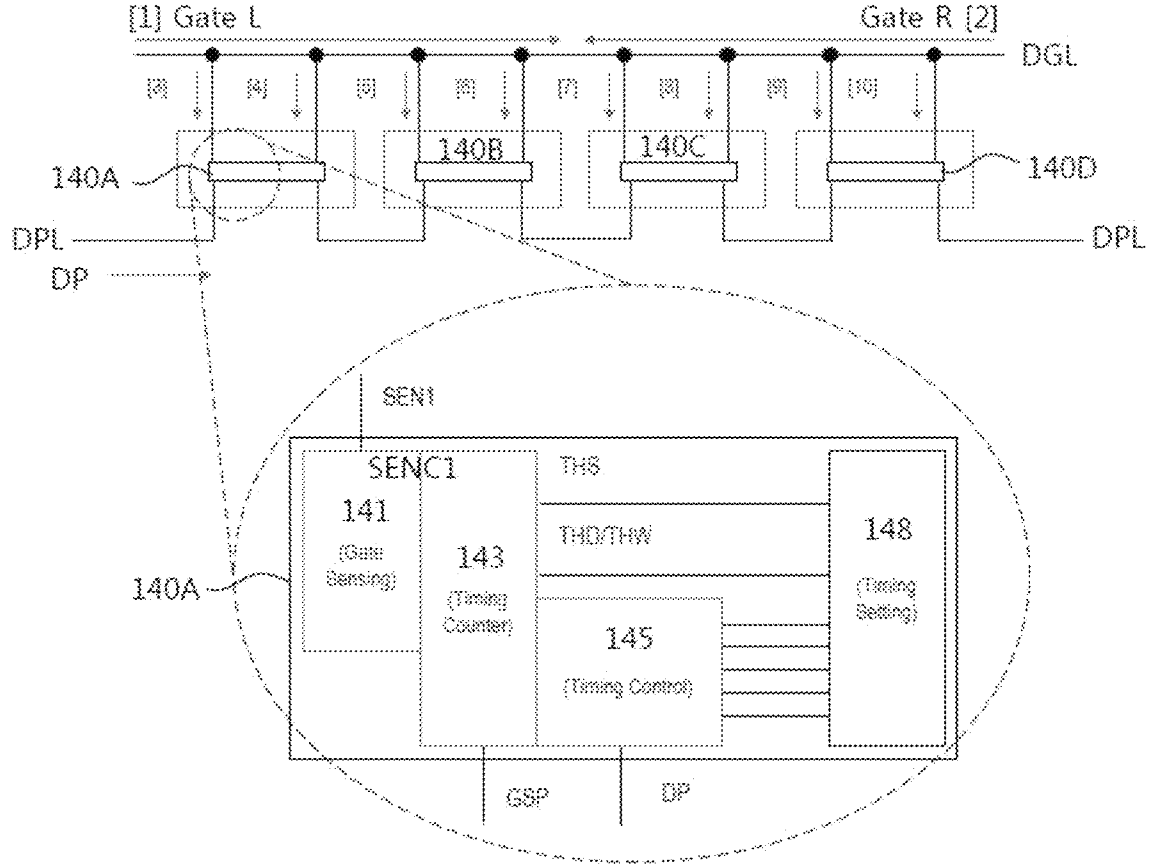
FIG. 28 is a partial configuration diagram of a large-sized LED display device.

FIG. 25 is an illustrative diagram illustrating a data driving unit including a timing setting unit according to the fifth embodiment, FIG. 26 is an illustrative configuration diagram of data driving units connected by a delay pulse line according to the fifth embodiment, FIG. 27 is an internal block diagram of a first data driving unit illustrated in FIG. 26, and FIG. 28 is a partial configuration diagram of a large-sized LED display device.

As illustrated in FIG. 25, the data driving unit 140 may further include a timing setting unit Timing Setting for preparing data output timing information, as in the second embodiment. As illustrated in FIG. 26, a first data driving unit 140A and a second data driving unit 140B may be electrically connected to a delay pulse line DPL along with the gate start pulse line GSPL through which the gate start pulse GSP is transmitted and the gate line (or dummy gate line) DGL through which the gate signal is transmitted.

The delay pulse line DPL is a line that transmits a delay pulse DP capable of reporting data output delay information. The first data driving unit 140A may receive the delay pulse DP from the outside, and may output the delay pulse DP by adding a value capable of reporting a data output state thereof to the adjacent second data driving unit 140B. In addition, the second data driving unit 140B may control a data output timing thereof based on the delay pulse DP output from the first data driving unit 140A. For example, the second data driving unit 140B may be configured to perform a control operation so that an output timing of a first output channel of the second data driving unit 140B follows an output timing of a last output channel of the first data driving unit 140A based on the delay pulse DP output from the first data driving unit 140A.

As illustrated in FIG. 27, as in the second embodiment, the first data driving unit 140A may include a serial-parallel controller, a shift register, a latch, a digital-to-analog conversion unit DAC, a multi-channel output unit Multi-channel Output, a first signal sensing unit SENC1, a second signal sensing unit SENC2, a controller (also referred to herein as a timing control unit) Timing Control, a timing setting unit Timing Setting, an amplification unit G/A, an analog-to-digital conversion unit ADC, a sampling circuit unit Sample Circuit, a signal transmission unit TX, etc.

Meanwhile, the serial-parallel controller may include a first pulse input terminal connected to the first delay pulse line DPL1 and a second pulse input terminal connected to the second delay pulse line DPL2 to exchange a delay pulse through the delay pulse line DPL as illustrated in FIG. 26. The delay pulse input or output through the first delay pulse line DPL1 and the second delay pulse line DPL2 may be transmitted to the serial-parallel controller, the signal sensing units SENC1 and SENC2, the latch, the timing control unit Timing Control, the timing setting unit Timing Setting, etc.

In addition, the serial-parallel controller may output an output control signal LDOS capable of controlling a data output to the latch based on the delay pulse. In addition, the serial-parallel controller may receive an output end signal LCOS for determining an output timing of the last output channel from the latch in order to control (change) and output the delay pulse.

As illustrated in FIG. 28, in the case of implementation as a large-sized LED display device, at least four data driving units 140A to 140D may be included as in the second embodiment. The first and second data driving units 140A and 140B may apply a data signal to a left display area with respect to a center line of the display panel, and the third and fourth data driving units 140C and 140D may apply a data signal to a right display area with respect to the center line of the display panel.

As in the second embodiment, the first signal sensing unit SENC1 may include a gate signal sensing unit 141 (Gate Sensing) that receives the first sensing signal SEN1 and a timing counter unit 143 (Timing Counter) that receives the gate start pulse GSP. In addition, the second signal sensing unit SENC1 may be configured similarly to the first signal sensing unit SENC1. In addition, the timing control unit Timing Control and the timing setting unit Timing Setting may receive the delay pulse DP to perform a function of controlling data output timings thereof.

Hereinafter, a method of driving the LED display device according to the fifth embodiment will be described. However, an operation of the second data driving unit capable of receiving the delay pulse from the first data driving unit will be described as an example.

Figure 29:
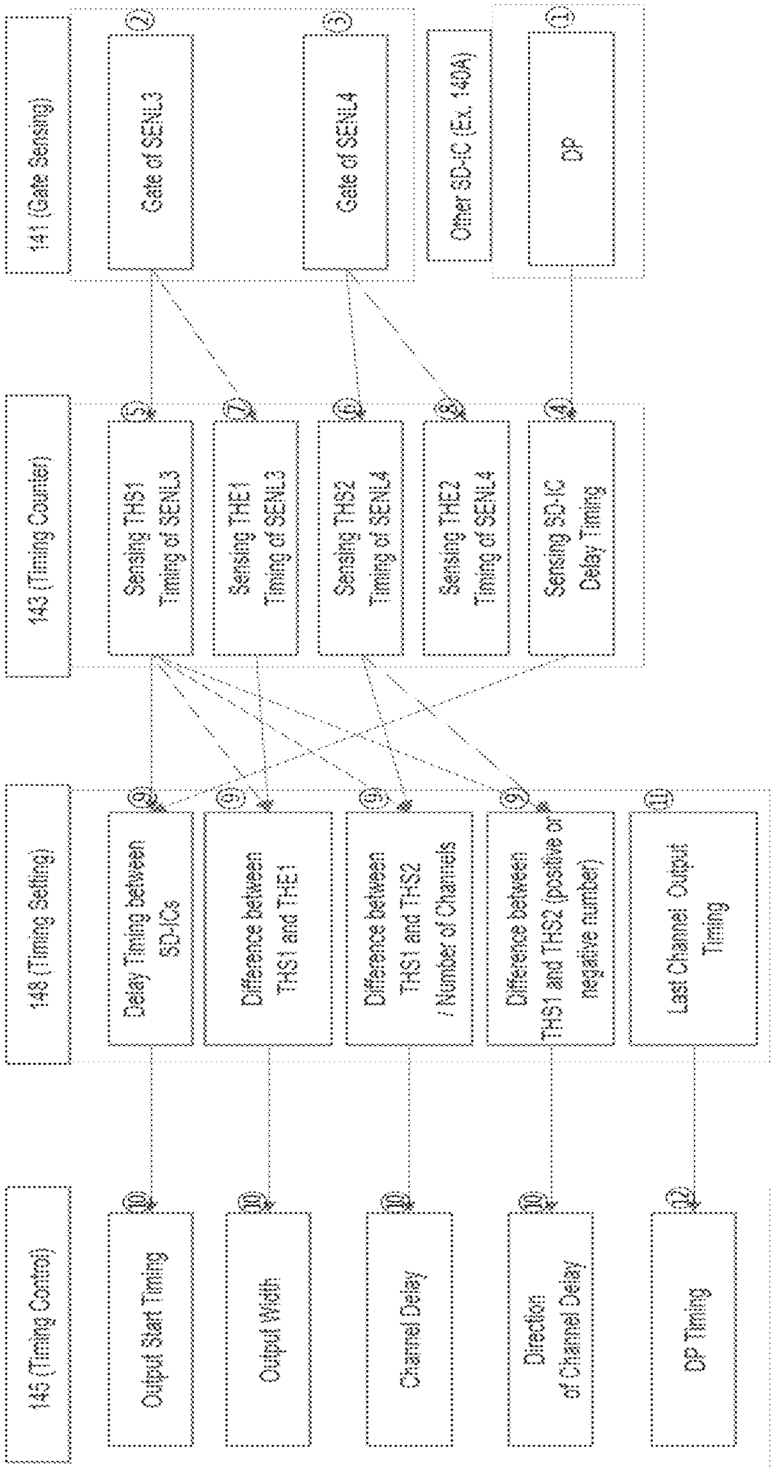
FIG. 29 is a diagram for describing a method of driving an LED display device according to the fifth embodiment.

FIG. 29 is a diagram for describing a method of driving the LED display device according to the fifth embodiment. Note that, in FIG. 29, the order ① to ⑫ is described to assist in understanding related to a flow of the driving method. However, the steps ① to ⑫ need not be carried out in the order in which they are described.

As illustrated in FIG. 29, first (①), the delay pulse DP may be output from the first data driving unit 140A. Next (②), the third point of the gate line may be sensed through the third sensing line SENL3 connected to a gate signal sensing unit 141 of the second data driving unit. Next (③), the fourth point of the gate line may be sensed through the fourth sensing line SENL4 connected to the gate signal sensing unit 141 of the second data driving unit.

Next (④), the delay time Delay Timing for the first data driving unit 140A may be counted by a timing counter unit 143 of the second data driving unit 140B. Next (5), the logic high start time THS1 of the gate signal at the third point may be sensed from the third point of the gate line by the timing counter unit 143 of the second data driving unit. Next (⑥), the logic high start time THS2 of the gate signal at the fourth point may be sensed from the fourth point of the gate line by the timing counter unit 143 of the second data driving unit. Next (⑦), the logic high end time THE1 of the gate signal at the third point may be sensed from the third point of the gate line by the timing counter unit 143 of the second driving unit. Next (⑧), the logic high end time THE2 of the gate signal at the fourth point may be sensed from the fourth point of the gate line by the timing counter unit 143 of the second data driving unit.

Next (⑨), a delay time Delay Timing between the first data driving unit and the second data driving unit may be calculated by the timing setting unit 148 of the second data driving unit. At the same time (⑨), a difference between the logic high start time THS1 of the gate signal at the third point and the logic high end time THE1 of the gate signal at the third point may be calculated by the timing setting unit 148 of the second data driving unit. At the same time (⑨), a difference between the logic high start time THS1 of the gate signal at the third point and the logic high start time THS2 of the gate signal at the fourth point may be divided by the number of output channels of the second data driving unit by the timing setting unit 148 of the second data driving unit. At the same time (⑨), a difference between the logic high start time THS1 of the gate signal at the third point and the logic high start time THS2 of the gate signal at the fourth point may be calculated by the timing setting unit 148 of the second data driving unit. In this instance, a delay value according to an output channel direction of the data driving unit may be determined depending on whether a difference between the two values is a positive number or a negative number.

Next (⑩), a timing control unit 145 of the second data driving unit may control (correct) the data output start timing Output Start Timing based on the delay time Delay Timing between the first data driving unit and the second data driving unit. At the same time (⑩), the timing control unit 145 of the second data driving unit may control the data output width Output Width based on the difference between the logic high start time THS1 of the gate signal at the third point and the logic high end time THE1 of the gate signal at the third point. At the same time (⑩), the timing control unit 145 of the second data driving unit may control a delay value Channel Delay between data output channels based on a value obtained by dividing the difference between the logic high start time THS1 of the gate signal at the third point and the logic high start time THS2 of the gate signal at the fourth point by the number of output channels of the second data driving unit. At the same time (⑩), the timing control unit 145 of the second data driving unit may control a delay value Direction of Channel Delay according to an output channel direction of the second data driving unit based on a difference between the logic high start time THS1 of the gate signal at the third point and the logic high start time THS2 of the gate signal at the fourth point.

Next (⑪), a signal indicating that an output timing Last Channel Output Timing of a last output channel has occurred may be calculated by the timing setting unit 148 of the second data driving unit. Next (⑫), the timing control unit 145 of the second data driving unit may control a delay pulse timing DP Timing to be transmitted to a next data driving unit (for example, a third data driving unit) based on the signal indicating that the output timing Last Channel Output Timing of the last output channel has occurred.

Meanwhile, in embodiments, at least any two of the preceding embodiments (methods) may be combined in order to increase driving stability and output accuracy when automatically correcting the data output timing. Correcting the data output timing will be described as follows. However, an operation of the second data driving unit capable of receiving the delay pulse from the first data driving unit will be described as an example.

Figure 30:
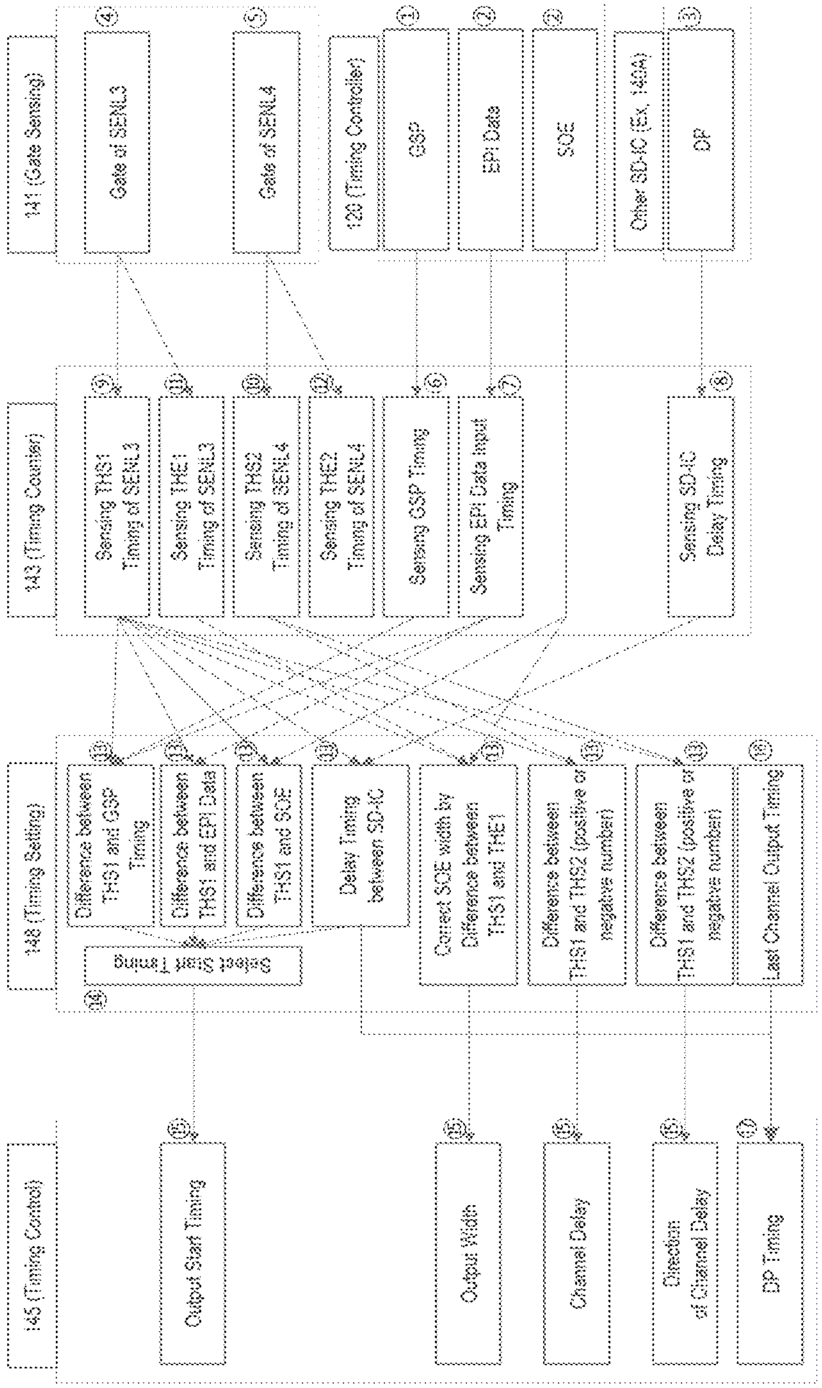
FIG. 30 is a diagram for describing a method of driving an LED display device according to a sixth embodiment.

FIG. 30 is a diagram for describing a method of driving an LED display device according to a sixth embodiment. In FIG. 30, noted that the order ① to ⑰ is described in order to assist in understanding related to a flow of the driving method. However, the steps ① to ⑰ need not be carried out in the order in which they are described.

As illustrated in FIG. 30, first (①), the gate start pulse GSP may be output from the timing controller 120. Next (②), the interface data output signal EPI Data may be generated at the same time as the source output activation signal SOE is output from the timing controller 120.

Next (③), the delay pulse DP may be output from the first data driving unit 140A. Next (④), the third point of the gate line may be sensed through the third sensing line SENL3 connected to the gate signal sensing unit 141 of the second data driving unit. Next (⑤), the fourth point of the gate line may be sensed through the fourth sensing line SENL4 connected to the gate signal sensing unit 141 of the second data driving unit.

Next (⑥), the gate start pulse GSP may be sensed by the timing counter unit 143 of the second data driving unit. Next (⑦), an input timing of the interface data output signal EPI Data may be sensed by the timing counter unit 143 of the second data driving unit. Next (⑧), a delay time Delay Timing for the first data driving unit 140A may be counted by the timing counter unit 143 of the second data driving unit.

Next (⑨), the logic high start time THS1 of the gate signal at the third point may be sensed from the third point of the gate line by the timing counter unit 143 of the second data driving unit. Next (⑩), the logic high start time THS2 of the gate signal at the fourth point may be sensed from the fourth point of the gate line by the timing counter unit 143 of the second data driving unit. Next (⑪), the logic high end time THE1 of the gate signal at the third point may be sensed from the third point of the gate line by the timing counter unit 143 of the second data driving unit. Next (⑫), the logic high end time THE2 of the gate signal at the fourth point may be sensed from the fourth point of the gate line by the timing counter unit 143 of the second data driving unit.

Next (⑬), a difference between the logic high start time THS1 of the gate signal at the third point and the gate start pulse GSP may be calculated by the timing setting unit 148 of the second data driving unit. At the same time (⑬), a difference between the logic high start time THS1 of the gate signal at the third point and the input timing of the interface data output signal EPI Data may be calculated by the timing setting unit 148 of the second data driving unit. At the same time (⑬), a difference between the logic high start time THS1 of the gate signal at the third point and the source output activation signal SOE may be calculated by the timing setting unit 148 of the second data driving unit. At the same time (⑬), a delay time Delay Timing between the first data driving unit and the second data driving unit may be calculated by the timing setting unit 148 of the second data driving unit. At the same time (⑬), a width of the source output activation signal SOE may be corrected using a difference between the logic high start time THS1 of the gate signal at the third point and the logic high end time THE1 of the gate signal at the third point by the timing setting unit 148 of the second data driving unit. At the same time (⑬), a difference between the logic high start time THS1 of the gate signal at the third point and the logic high start time THS2 of the gate signal at the fourth point may be divided by the number of output channels of the second data driving unit by the timing setting unit 148 of the second data driving unit. At the same time (⑬), a difference between the logic high start time THS1 of the gate signal at the third point and the logic high start time THS2 of the gate signal at the fourth point may be calculated by the timing setting unit 148 of the second data driving unit. In this instance, a delay value according to an output channel direction of the data driving unit may be determined depending on whether a difference between the two values is a positive number or a negative number.

Next (⑭), at least one of (A) a difference between the logic high start time THS1 of the gate signal at the third point and the gate start pulse GSP, (B) a difference between the logic high start time THS1 of the gate signal at the first point and the interface data output signal EPI Data, (C) a difference between the logic high start time THS1 of the gate signal at the third point and the source output activation signal SOE, or (D) a delay time Delay Timing between the first data driving unit and the second data driving unit may be selected and output so that the output timing Start Timing is controlled by the timing setting unit 148 of the second data driving unit.

Next (⑮), the timing control unit 145 of the second data driving unit may control (correct) the data output start timing Output Start Timing based on at least one selected from (A), (B), (C), or (D). At the same time (⑮), the timing control unit 145 of the second data driving unit may control a data output width Output Width based on a difference between the logic high start time THS1 of the gate signal at the third point and the logic high end time THE1 of the gate signal at the third point. At the same time (⑮), the timing control unit 145 of the second data driving unit may control a delay value Channel Delay between data output channels based on a value obtained by dividing a difference between the logic high start time THS1 of the gate signal at the third point and the logic high start time THS2 of the gate signal at the fourth point by the number of output channels of the second data driving unit. At the same time (⑮), the timing control unit 145 of the second data driving unit may control a delay value Direction of Channel Delay according to an output channel direction of the second data driving unit based on a difference between the logic high start time THS1 of the gate signal at the third point and the logic high start time THS2 of the gate signal at the fourth point.

Next (⑯), a signal indicating that an output timing Last Channel Output Timing of a last output channel has occurred may be calculated by the timing setting unit 148 of the second data driving unit.

Next (⑰), the timing control unit 145 of the second data driving unit may control a delay pulse timing DP Timing to be transmitted to a next data driving unit (for example, the third data driving unit) based on the signal indicating that the output timing Last Channel Output Timing of the last output channel has occurred.

Hereinafter, examples of methods for adjusting output timings in the above-described embodiments will be described as follows.

Figure 31:
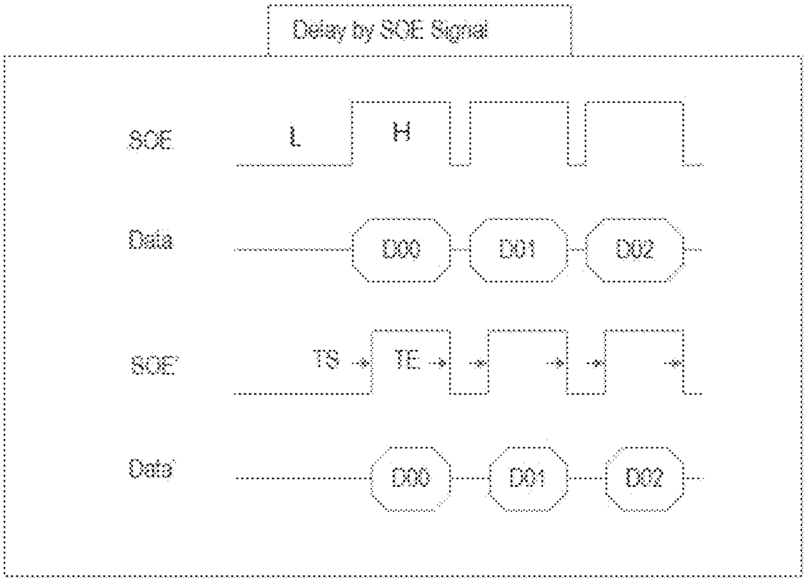
FIG. 31 is an illustrative diagram illustrating a method of adjusting an output timing applicable to the second, third, and sixth embodiments.
Figure 32:
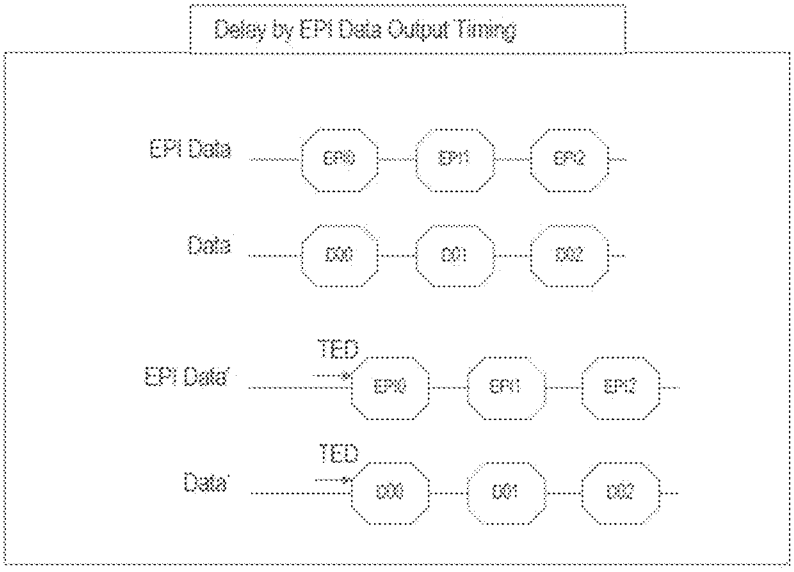
FIG. 32 is an illustrative diagram illustrating a method of adjusting an output timing applicable to the fourth and sixth embodiments.
Figure 33:
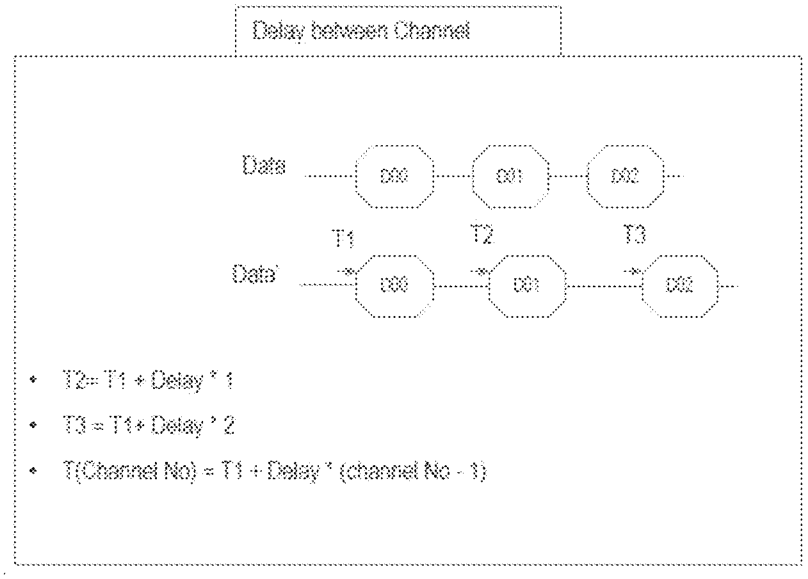
FIG. 33 is an illustrative diagram illustrating a method of adjusting an output timing applicable to the first to sixth embodiments.
Figure 34:
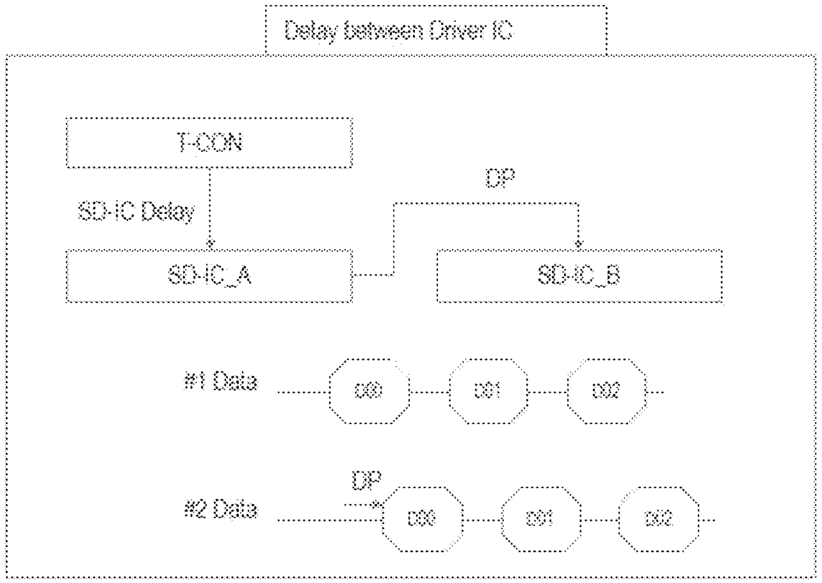
FIG. 34 is an illustrative diagram illustrating a method of adjusting an output timing applicable to the fifth and sixth embodiments.

FIG. 31 is an illustrative diagram illustrating a method of adjusting an output timing applicable to the second, third, and sixth embodiments, FIG. 32 is an illustrative diagram illustrating a method of adjusting an output timing applicable to the fourth and sixth embodiments, FIG. 33 is an illustrative diagram illustrating a method of adjusting an output timing applicable to the first to sixth embodiments, and FIG. 34 is an illustrative diagram illustrating a method of adjusting an output timing applicable to the fifth and sixth embodiments.

As illustrated in FIG. 31, in the second, third, and sixth embodiments, the data output timing may be controlled based on the source output activation signal SOE. The data signal Data may be output as D00, D01, D02, etc. whenever the source output activation signal SOE is generated as logic high (H). However, when a delayed source output activation signal SOE' is prepared by delaying a start time TS and an end time TE of the source output activation signal SOE, it is possible to generate a delayed data signal Data' output timing.

As illustrated in FIG. 32, the fourth and sixth embodiments may control the data output timing based on the interface data output signal EPI Data. The data signal Data may be output as D00, D01, D02, etc. whenever the interface data output signal EPI Data is generated (generated in the form of a packet) such as EP10, EP11, EP12, etc. However, when a delayed interface data output signal EPI Data' is prepared by delaying the interface data output signal EPI Data as TED, it is possible to generate the delayed data signal Data' output timing.

As illustrated in FIG. 33, the first to sixth embodiments may control the data output timing based on a delay value between output channels of the data driving unit. The data signal Data may be output as D00, D01, D02, etc. at the same time in all channels. However, when the delay value between the output channels is delayed so that the delay value gradually increases as T1<T2<T3, it is possible to generate the delayed data signal Data' output timing between the output channels.

In FIG. 33, the delay value gradually increases as "T2=T1+Delay (delay value)*1", "T3=T1+Delay (delay value)*2", and "T (Channel No, number of channels)=T1+Delay (delay value)*(channel No−1)" as an example, which is only an example, and embodiments are not limited thereto.

As illustrated in FIG. 34, the fifth and sixth embodiments may control the data output timing based on the delay pulse applied to the data driving unit. For example, a first data driving unit SD-IC_A may receive a basic delay value SD-IC Delay from the timing controller T-CON. In addition, the first data driving unit SD-IC_A may transmit the delay pulse DP to a second data driving unit SD-IC_B without changing the basic delay value SD-IC Delay, or may reflect a data output state thereof, change the delay pulse DP, and transmit the delay pulse DP to the second data driving unit SD-IC_B.

Accordingly, while the first data driving unit SD-IC_A may output a data signal #1 Data in a general form (a form without delay) such as D00, D01, D02, etc., the second data driving unit SD-IC_B may output the data signal #2 Data in a form delayed by a time corresponding to the delay pulse DP, such as D00, D01, D02, etc.

In addition, as can be seen with reference to the above-described embodiments, in order to assist in understanding, a configuration or method of a device related to a method of automatically correcting the data output timing has been described. However, it should be construed that one or more of the respective embodiments may be combined.

As described above, embodiments have an effect of automatically correcting and optimizing the data output timing of the data driving unit, for example based on interworking between the timing controller and the data driving unit. In addition, embodiments have an effect of improving driving stability and output accuracy of the data driving unit since the gate signal is sensed through the gate line, and the data output timing is controlled by referring to an operation of another device (or component) or a signal generated therefrom and analyzing the operation and the signal.

It will be apparent to those skilled in the art that various modifications and variations can be made to the embodiments without departing from the scope of the appended claims. Thus, it is intended that the present disclosure covers the modifications and variations provided they come within the scope of the appended claims and their equivalents.

Further, the disclosure includes the following clauses:

Clause 1. A display device comprising:
- a display panel configured to display an image;
- a gate driving circuit connected to the display panel;
- a data driving circuit connected to the display panel; and
- a timing controller configured to control the gate driving unit and the data driving circuit,
- wherein the data driving circuit senses a gate signal output from the gate driving circuit, and a data output timing is controlled based on an operation of another device or a signal generated therefrom together with the sensed gate signal.

Clause 2. The display device according to clause 1, wherein the data driving circuit includes at least two sensing terminals connected to two points of a gate line or a dummy gate line located on the display panel to sense a gate signal output from the gate driving circuit.

Clause 3. The display device according to clause 2, wherein the at least two sensing terminals are located at an outermost side of one side and an outermost side of the other side of the data driving circuit.

Clause 4. The display device according to any preceding clause, wherein a data output timing of the data driving circuit is controlled based on the gate signal and a gate start pulse applied to the gate driving circuit.

Clause 5. The display device according to any preceding clause, wherein a data output timing of the data driving circuit is controlled based on the gate signal and a source output activation signal applied to the data driving circuit.

Clause 6. The display device according to any preceding clause, wherein a data output timing of the data driving circuit is controlled based on the gate signal and a data output signal through an interface coupled between the timing controller and the data driving circuit.

Clause 7. The display device according to any preceding clause, wherein the data driving circuit includes at least two data driving circuits electrically connected to each other through a delay pulse line for inputting and outputting a pulse including data output delay information of another device or the data driving circuit.

Clause 8. The display device according to any preceding clause, wherein the data driving circuit includes a signal sensing circuit-configured to calculate a logic high start time, a logic high end time, and a logic high holding time of a gate signal based on the gate signal output from the gate driving circuit, a gate start pulse applied to the gate driving circuit, and a voltage maintaining the same level as a level of gate high of the gate signal.

Clause 9. A method of driving a display device including a display panel configured to display an image, a gate driving circuit connected to the display panel, a data driving circuit connected to the display panel, and a timing controller configured to control the gate driving circuit-and the data driving circuit, the method comprising:

sensing a gate signal output from the gate driving circuit;

calculating a data output delay of the data driving circuit based on the gate signal; and setting a data output timing of the data driving circuit-based on the data output delay.

Clause 10. The method according to clause 9, wherein the data output timing of the data driving circuit is:

controlled based on the gate signal and a gate start pulse applied to the gate driving circuit;

controlled based on the gate signal and a source output activation signal applied to the data driving circuit; or controlled based on the gate signal and a data output signal through an interface coupled between the timing controller and the data driving circuit.

What is claimed is:

1. A display device comprising:

a display panel configured to display an image;

a gate driving circuit connected to the display panel;

a data driving circuit connected to the display panel; and a timing controller configured to control the gate driving circuit and the data driving circuit, wherein the data driving circuit is configured to:

control a data output timing of the data driving circuit based on a gate signal output from the gate driving circuit; and control the data output timing of the data driving circuit based on a sensed gate signal and a gate start pulse applied to the gate driving circuit, wherein the gate start pulse is simultaneously transmitted to the gate driving circuit and the data driving circuit, and wherein the data driving circuit:

calculates a data output delay of the data driving circuit based on sensed the gate signal and the gate start pulse; and sets the data output timing of the data driving circuit based on the data output delay.

2. The display device according to claim 1, wherein the data driving circuit is configured to control the data output timing of the data driving circuit based on an operation of a component of the display device, or a signal generated therefrom, together with the sensed gate signal.

3. The display device of claim 2, wherein the component is at least one of: a timing setting unit of the timing controller; a timing setting unit of the data driving circuit; or a timing control unit of the data driving circuit.

4. The display device according to claim 1, wherein the display device includes at least two sensing terminals connected to separate points of a gate line or a dummy gate line located on the display panel, wherein the at least two sensing terminals are configured to sense the gate signal output from the gate driving circuit, wherein the data driving circuit includes the at least two sensing terminals.

5. The display device according to claim 4, wherein the at least two sensing terminals are located at an outermost side of one side and an outermost side of the other side of the data driving circuit.

6. The display device according to claim 1, wherein the data driving circuit includes at least two data driving units electrically connected to each other through a delay pulse line for inputting and outputting a pulse, wherein the pulse includes data output delay information of the component or the data driving circuit.

7. The display device according to claim 1, wherein the data driving circuit includes a signal sensing circuit configured to calculate a logic high start time, a logic high end time, and a logic high holding time of the sensed gate signal based on the gate signal output from the gate driving circuit, a gate start pulse applied to the gate driving circuit, and a voltage source maintaining the same level as a level of a gate high of the sensed gate signal.

8. A method of driving a display device including a display panel configured to display an image, a gate driving circuit connected to the display panel, a data driving circuit connected to the display panel, and a timing controller configured to control the gate driving circuit and the data driving circuit, the method comprising:

sensing a gate signal output from the gate driving circuit; and controlling a data output timing of the data driving circuit based on the sensed gate signal, wherein the data output timing of the data driving circuit is controlled based on the gate signal and a gate start pulse applied to the gate driving circuit, wherein the gate start pulse is simultaneously transmitted to the gate driving circuit and the data driving circuit, and wherein the data driving circuit:

calculates a data output delay of the data driving circuit based on sensed the gate signal and the gate start pulse; and sets the data output timing of the data driving circuit based on the data output delay.

9. The method of claim 8, comprising controlling the data output timing of the data driving circuit based on an operation of a component of the display device, or a signal generated therefrom, together with the sensed gate signal, wherein the component is at least one of: a timing setting unit of the timing controller; a timing setting unit of the data driving circuit; or a timing control unit of the data driving circuit.

10. The display device according to claim 4, wherein the data driving circuit includes at least two signal sensing circuits connected to the at least two sensing terminals.

11. The display device according to claim 10, wherein the at least two signal sensing circuits include a gate signal sensing circuit configured to receive the sensed gate signal and a timing counter circuit configured to receive the gate start pulse respectively.

* * * * *